US010959505B1

(12) United States Patent
Zadro

(10) Patent No.: US 10,959,505 B1
(45) Date of Patent: Mar. 30, 2021

(54) FOGLESS SHOWER MIRROR SYSTEM

(71) Applicant: Zadro, Inc., Huntington Beach, CA (US)

(72) Inventor: Zlatko Zadro, Huntington Beach, CA (US)

(73) Assignee: Zadro, Inc., Huntington Beach, CA (US)

(*) Notice: Subject to any disclaimer, the term of this patent is extended or adjusted under 35 U.S.C. 154(b) by 202 days.

(21) Appl. No.: 16/289,086

(22) Filed: Feb. 28, 2019

(51) Int. Cl.
*A45D 42/16* (2006.01)
*A45D 42/10* (2006.01)
*G02B 7/18* (2021.01)
*A47G 1/02* (2006.01)

(52) U.S. Cl.
CPC ............ *A45D 42/16* (2013.01); *A45D 42/10* (2013.01); *G02B 7/1815* (2013.01); *A47G 1/02* (2013.01)

(58) Field of Classification Search
CPC ........ A45D 42/16; A45D 42/08; A45D 42/10; A45D 42/14; A47G 1/02; G02B 7/1815; G02B 7/181
See application file for complete search history.

(56) References Cited

U.S. PATENT DOCUMENTS

| 2004/0156107 | A1* | 8/2004 | Blackwood | ............ A45D 42/08 359/509 |
| 2015/0198803 | A1* | 7/2015 | Mills | ...................... A45D 42/10 359/512 |

* cited by examiner

*Primary Examiner* — Marin Pichler
(74) *Attorney, Agent, or Firm* — UltimatEdge IP Law Group, P.C.; Dean G. Stathakis

(57) ABSTRACT

The present specification discloses a mirror assembly having an image viewing surface which resists fogging caused by condensation of water vapor on the viewing surface and a fogless mirror system comprising such a mirror assembly and an attachment system as well as methods and uses for such mirror assembly and fogless mirror system.

20 Claims, 16 Drawing Sheets

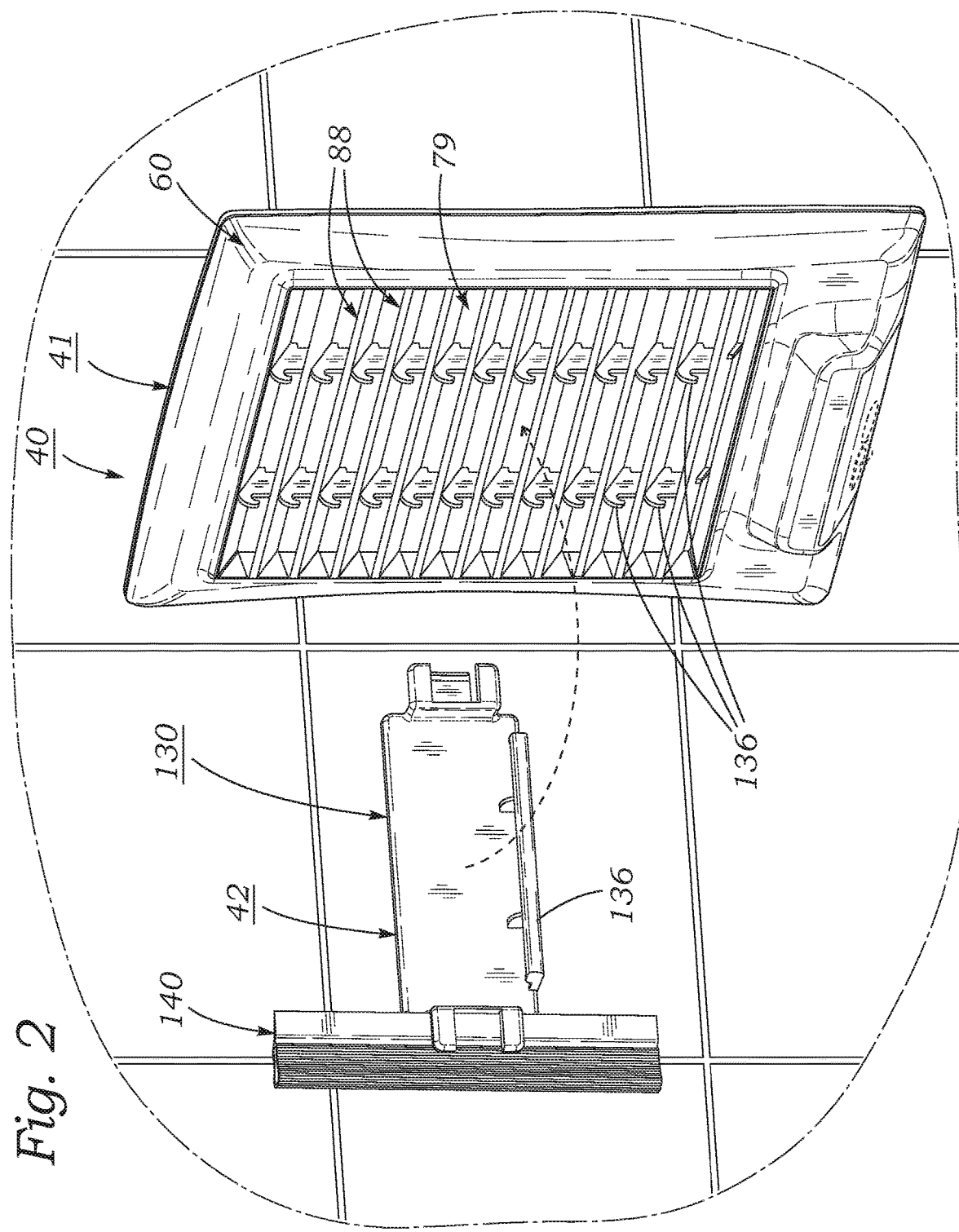

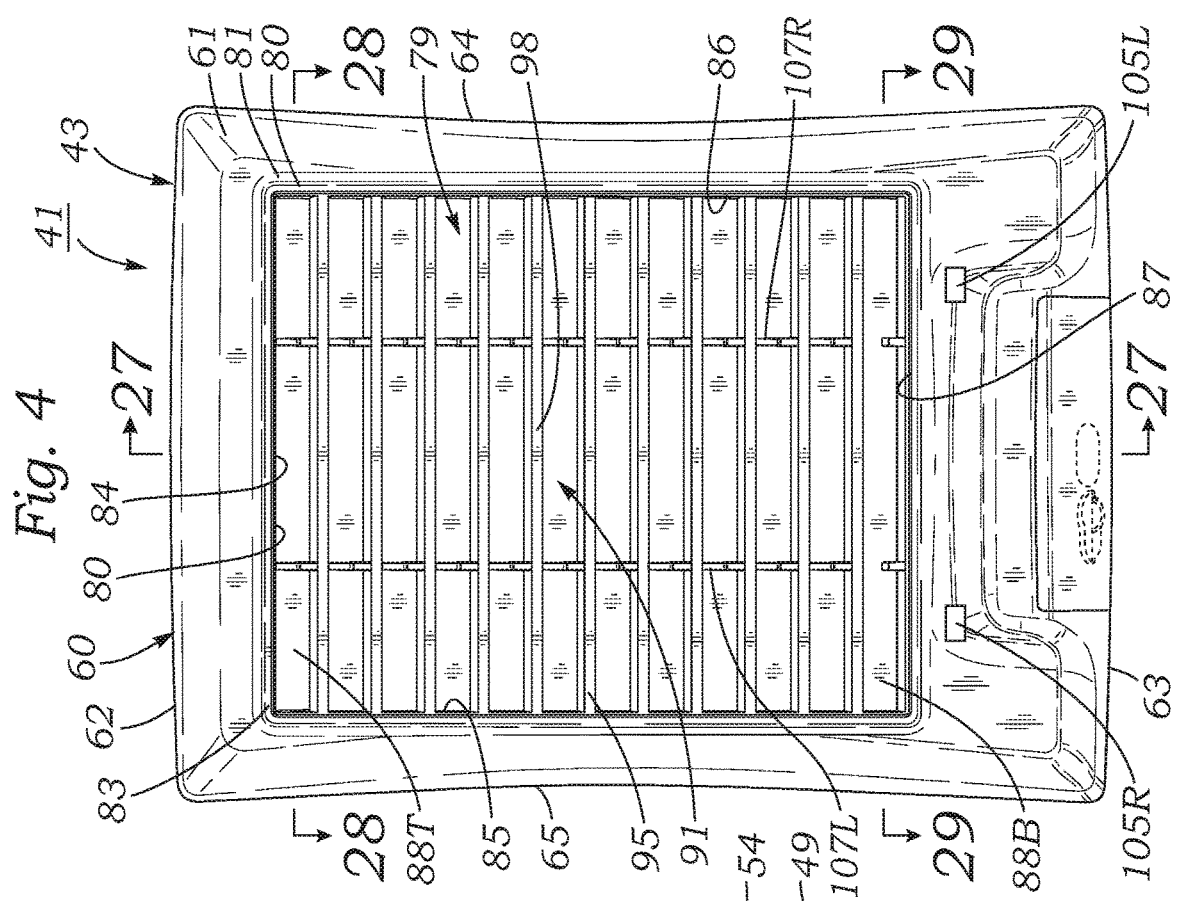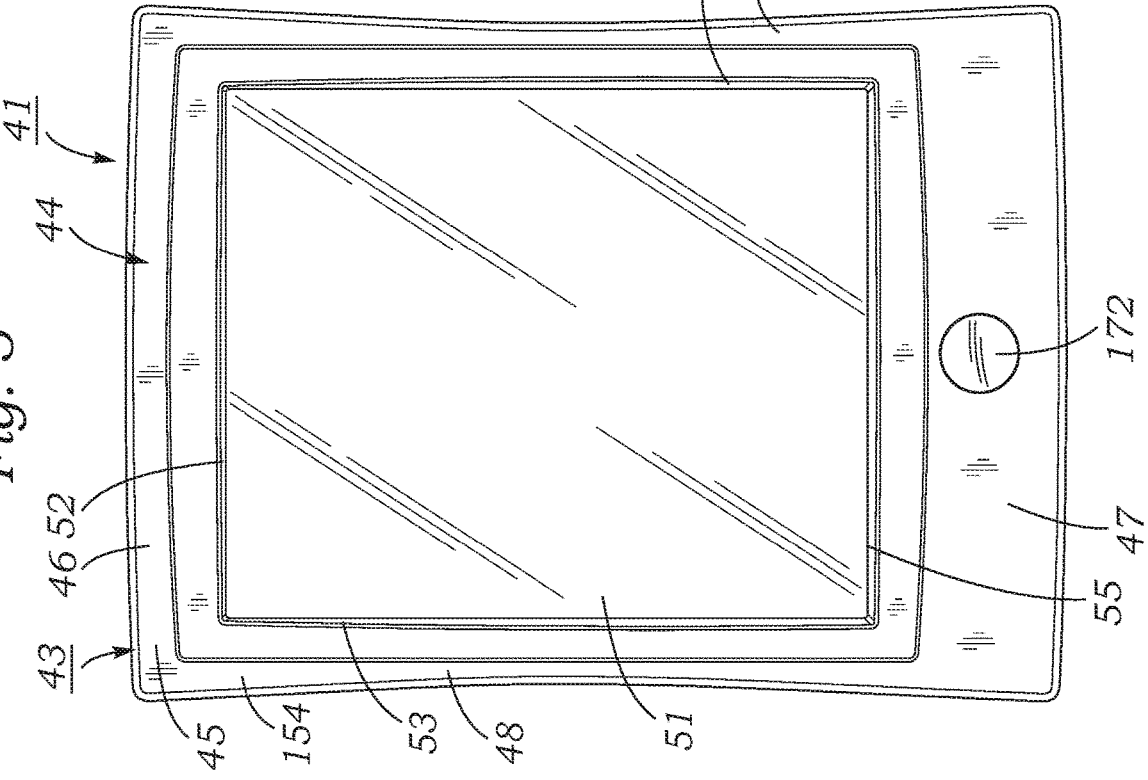

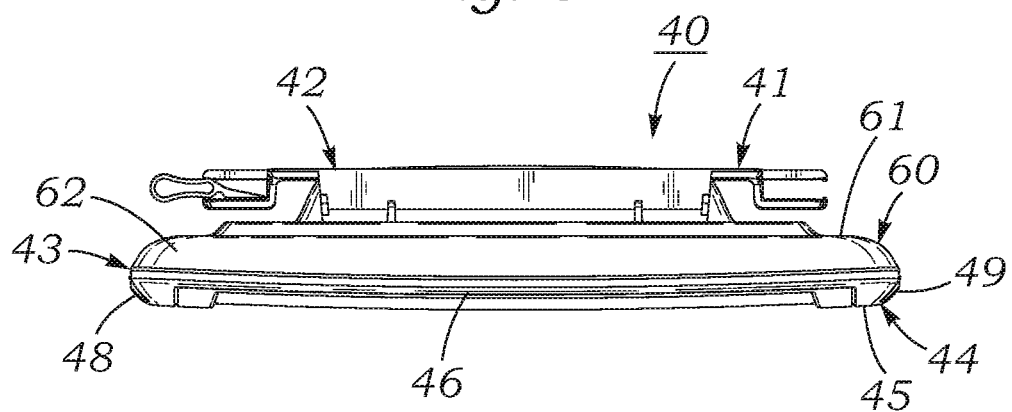
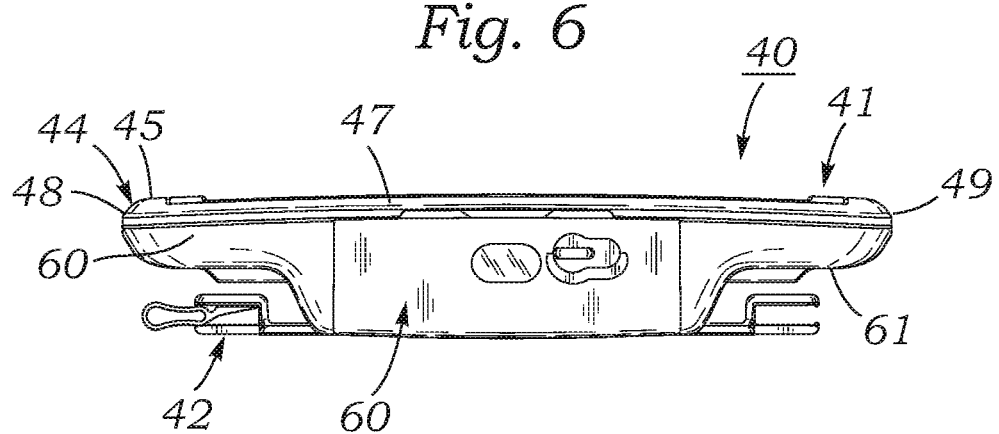

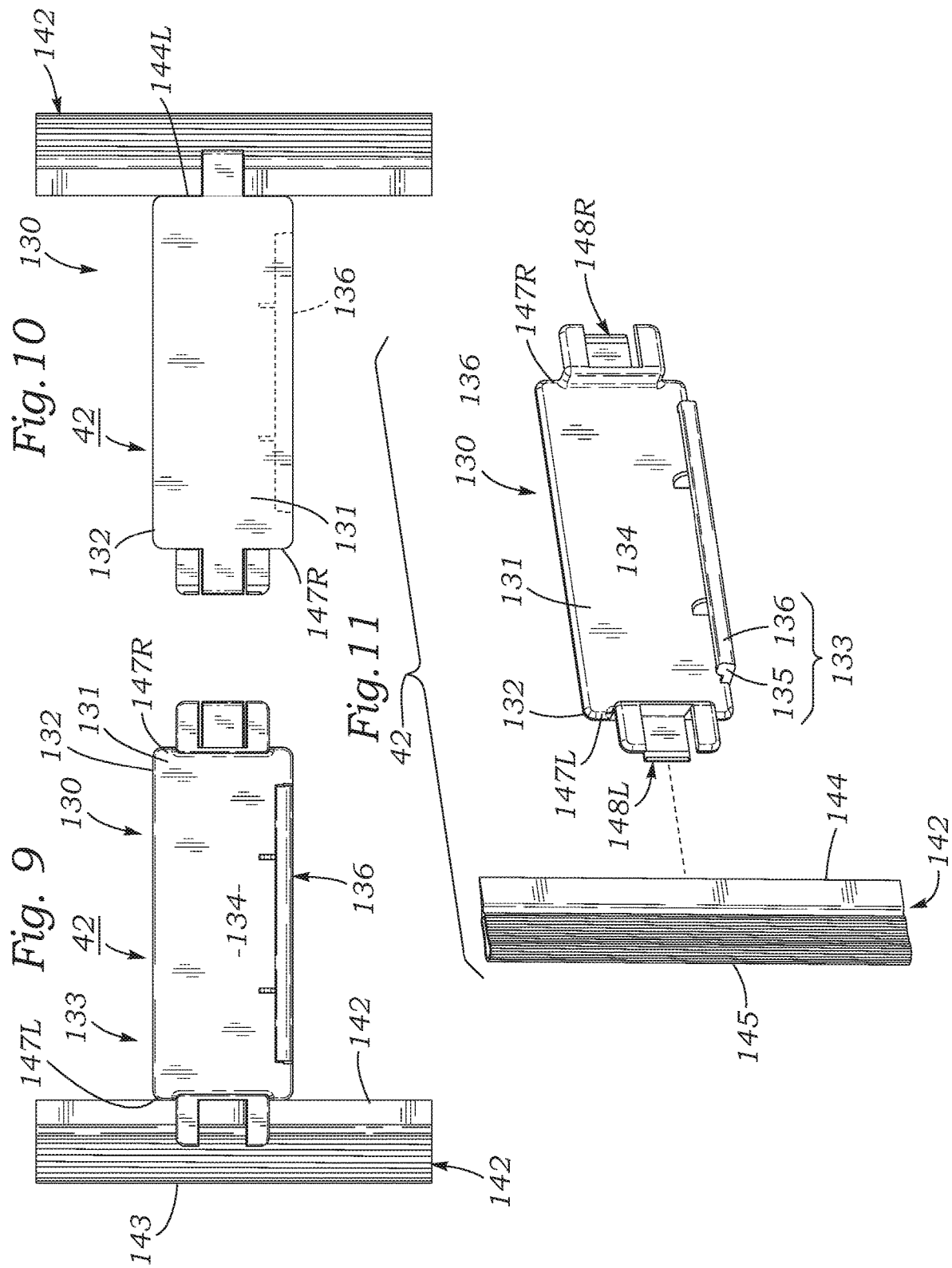

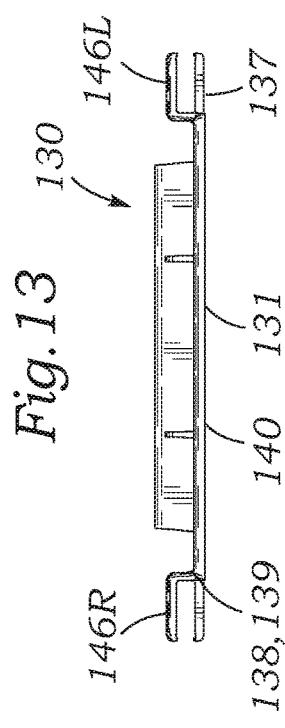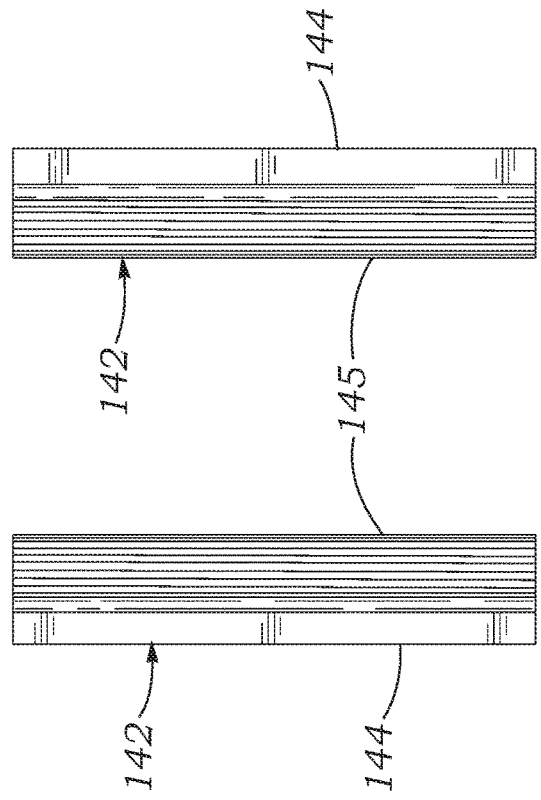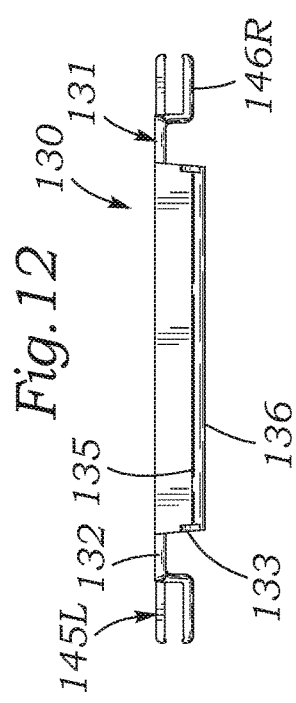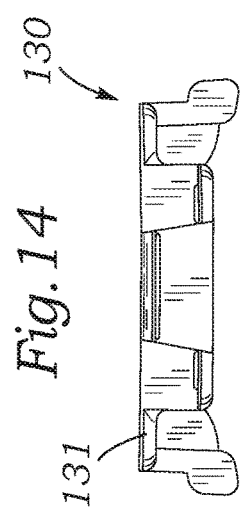

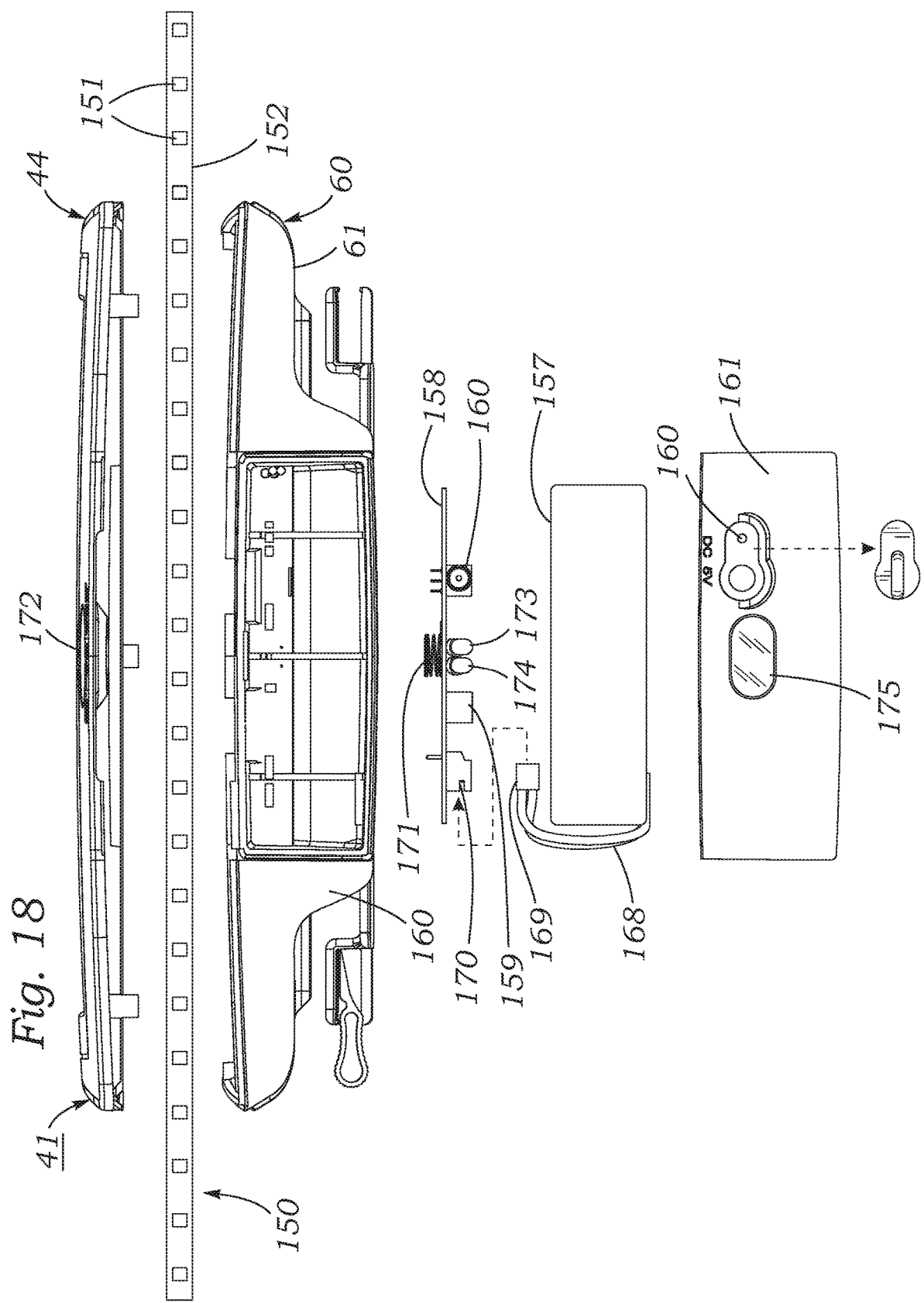

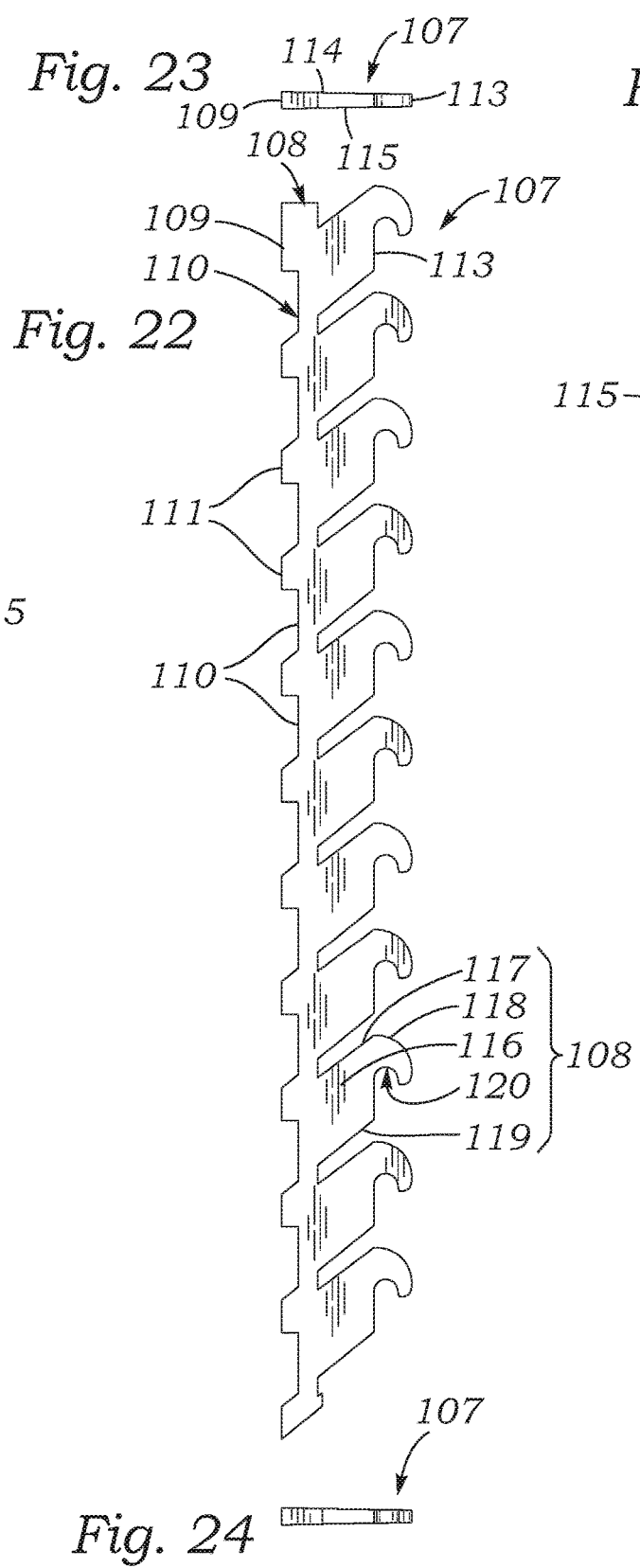

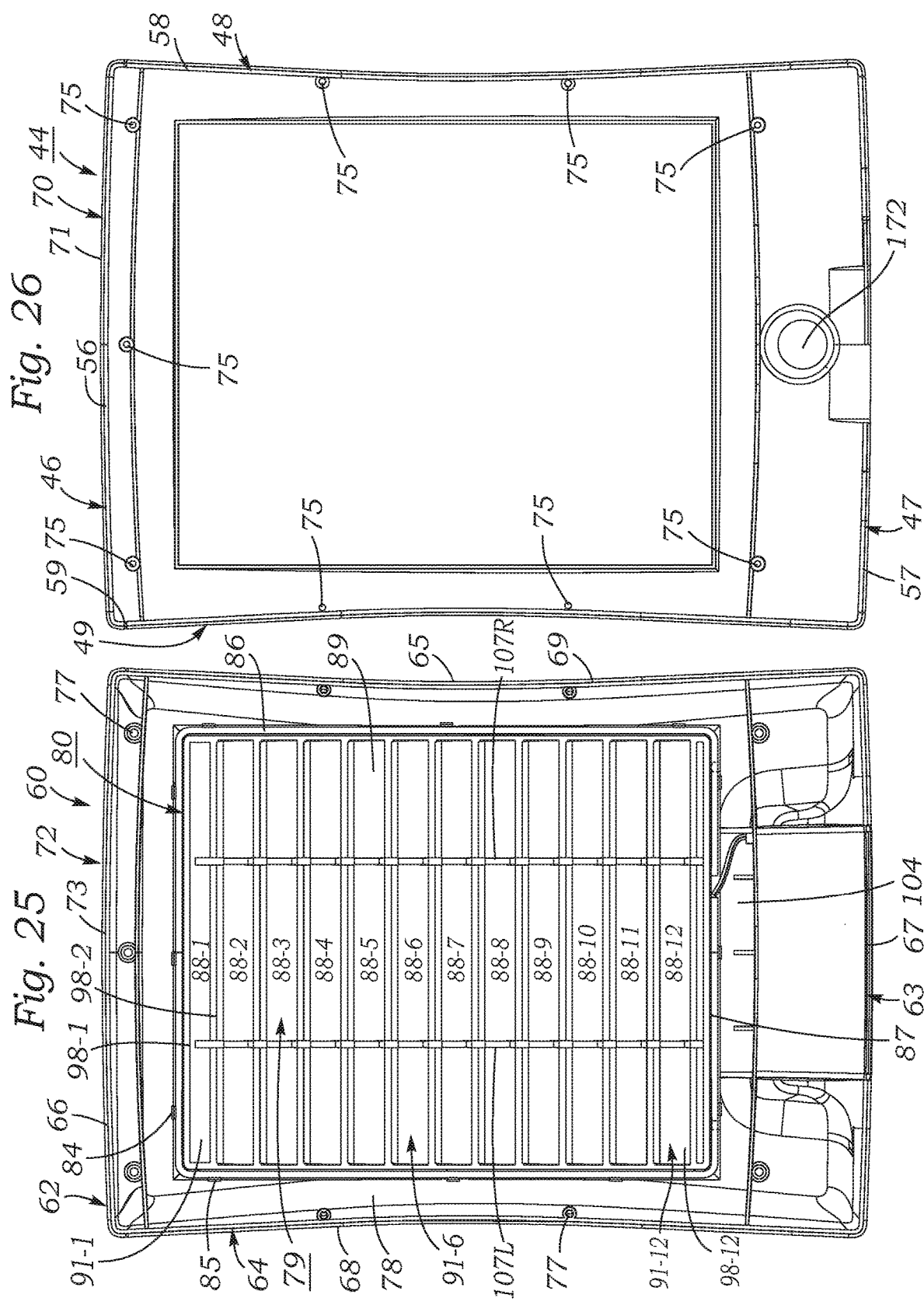

FOGLESS SHOWER MIRROR SYSTEM

A. FIELD OF THE INVENTION

The present invention relates to mirrors of the type used by people as an aid to performing personal grooming tasks such as shaving. More particularly, the invention relates to a fogless shower mirror which includes a mirror assembly that is removable from a support bracket and has a multi-compartment water reservoir which is manually fillable with warm water from a shower head, or other such source, and re-attachable to the support stand, the warm water warming a mirror plate mounted to the mirror assembly to thus resist formation of image-fogging condensation droplets on the reflective surface of the mirror plate.

The novel design of the multi-compartment water reservoir of the present invention affords increased efficiency of heat transfer from warm water to a reflective mirror plate of the system, thus increasing the time duration that the mirror plate remains fogless and also decreases substantially the time required to fill and re-fill the mirror with warm water. The fogless shower system according to the present invention also has an attachment system that includes a wall-mount suspension bracket that facilitates attaching the mirror assembly at various selected heights to the wall of a shower enclosure, removing the mirror assembly to fill it with warm water, and re-attaching the mirror assembly to the bracket, an internal illuminator powered by an internal rechargeable battery, and a squeegee for cleaning the surface of the mirror.

B. DESCRIPTION OF BACKGROUND ART

A significant number of people utilize mirrors while showering to facilitate performance of personal care functions such as shaving. However, the use of mirrors in showers was in the past relatively limited, because the warm moist air within a shower enclosure tends to quickly condense on the surface of any mirror used in the shower, obscuring an image of a person's face reflected from the mirror surface so completely as to render the mirror practically useless within a few minutes after a shower has begun.

In response to the problem of moisture condensing on a mirror surface and thereby limiting the usefulness of mirrors in high humidly environments, such as shower enclosures and other locations within a bathroom, the present inventor disclosed in U.S. Pat. No. 4,733,468, issued Mar. 29, 1988, a "fogless" mirror which is highly resistant to formation of condensation droplets on the surface o9f the mirror. The fogless mirror disclosed in the '468 patent utilizes warm water tapped from the warm water supply pipe to a shower head, to heat the surface of the mirror. Since water vapor in a shower is produced largely by evaporation, the water vapor is always somewhat cooler than the warm water supplied to the shower head. And, since water vapor will condense only on surfaces which are at lower temperature than the vapor, heating the surface of the mirror precludes fogging of the mirror. Therefore, the fogless mirror disclosed in the present inventor's '468 patent proved to be a highly effective solution to the problem of bathroom mirror fogging, and mirrors utilizing the teachings of that patent have been widely marketed and used.

U.S. Pat. No. 4,832,475, Daniels, Non-Fogging Shower Mirror discloses a non-fogging shower mirror which has generally the shape of a hollow rectangular box which has on a front wall thereof a rectangular reflective mirror plate. The back wall of the box is penetrated near the top edge of the wall by a fill hole for receiving warm water from a faucet, when the mirror is unhooked from suction cups which are attachable to a shower wall used to support the box with the mirror vertically oriented. A small cross-section exit port in a bottom wall of the box allows water to drain slowly from the hollow interior space of the box, which serves as a water reservoir.

Because the cross-sectional shape of the water reservoir disclosed in Daniels is uniform, the weight of water required to fill the reservoir increases in direct proportion to the size of the mirror used, and thus potentially causes the suction cup or other support mounting elements to fail. Also, the design of the Daniel's fill port inherently requires that it be small relative to other dimensions of the mirror reservoir box, making filling or manual emptying of the reservoir relatively slow. In response to limitations of prior art non-fogging shower mirrors of the type identified above, the present inventor created an improved Fogless Shower Mirror which is disclosed in U.S. Pat. No. 8,746,901, issued on Jun. 10, 2014.

In U.S. patent application Ser. No. 15/193,079, now U.S. Pat. No. 10,117,499 the present inventor disclosed an automatically fillable fogless shower mirror that is both manually fillable and automatically fillable by means of an adapter connectable to a warm water supply pipe.

The present invention was created to provide a fogless shower mirror system that has improved heat transfer characteristics which increase the time duration that the mirror may be used before becoming fogged, more quickly and easily fillable and re-fillable with warm water, quickly and easily removable and attachable at various selected heights to a shower enclosure wall, and proved with an internal illuminator that is effective in illuminating objects such as a person's face located in front of the mirror, and powered by an internal rechargeable barrier, and a squeegee for cleaning the reflective surface of the mirror.

OBJECTS OF THE INVENTION

An object of the present invention is to provide a fogless shower mirror system that includes a mirror assembly which has a reflective mirror plate that has a rear surface which thermally conductively contacts a water reservoir that is fillable with warm water to thus heat the front surface of the reflective mirror plate to a temperature higher than that of water vapor in a shower enclosure, thereby preventing fogging condensation of water vapor in a shower enclosure on the mirror surface, the mirror assembly including a multi-compartment water reservoir that is contained in a rectangular frame that occupies a substantial fraction of the rear side of a housing of the mirror assembly.

Another object of the invention is to provide a fogless shower mirror system that has improved heat transfer characteristics that decrease the time it takes for the mirror to defog before use and increase the time duration that the mirror may be used before becoming fogged.

Another object of the invention is to provide a fogless shower mirror system that includes a mirror assembly which has a water reservoir comprised of a vertically arranged series of laterally elongated rectangularly shaped reservoir compartments that each have a rear rectangular-outline entrance opening for receiving warm water, and a front rectangular opening located at a lower elevation than the rear opening for conducting a downwardly angled rectangular cross-section column of warm water in each compartment into contact with the rear surface of a reflective mirror plate of the mirror assembly.

Another object of the invention is to provide a fogless shower mirror system that includes a mirror assembly which has located in a rear rectangular housing part thereof a water reservoir comprised of a vertically arranged series of compartments that each have a rear entrance opening for receiving water, and a front opening for conducting water in the compartment into contact with the rear surface of a reflective mirror plate of the mirror assembly, and thin, laterally elongated slits between front edges of a pair of upper and lower baffle plates that form each compartment and the rear surface, the mirror plate, the slits enabling water from upper compartments to flow downwardly on the rear surface of the mirror plate to lower compartments.

Another object of the invention is to provide a fogless shower mirror system that includes a mirror assembly which has a water reservoir comprised of a vertically arranged series of laterally elongated rectangular compartments, each of which has an upper wall consisting of an upper downwardly angled baffle plate and a lower wall consisting of a lower downwardly angled baffle plate, the front laterally disposed edges of the baffle plates being spaced a short distance rearward of the rear surface of a reflective mirror plate to create paths for warm water to flow downwardly on the rear surface of the reflective mirror plate, the flowing water transferring heat more quickly to the mirror plate than standing water.

Another object of the invention is to provide a fogless shower mirror system that includes a vertically arranged series of water reservoir compartments which have upper and lower downwardly and forwardly angled baffle walls, and a pair of laterally spaced apart vertical hanger rib plates that have extending from rear edges thereof and rearwardly through the rear opening of each compartment a pair of laterally spaced apart suspension hooks, each having in a lower surface thereof a suspension hook notch, and a suspension bracket attachable to a shower wall and having a laterally disposed suspension rib for engaging a selected pair of suspension hooks and thereby removably attaching the mirror assembly at variously selected heights on a shower enclosure surface.

Another object of the invention is to provide a fogless shower mirror that includes a squeegee removably attachable to the suspension bracket.

Another object of the invention is to provide a fogless shower mirror system that includes an internal illuminator powered by an internal rechargeable battery.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY

Briefly stated, the present invention comprehends a fogless shower mirror system for facilitating the performance of personal grooming functions such as shaving in a steamy environment such as a shower enclosure, in which the use of a conventional mirror to view one's face would be precluded by the condensation of water vapor in the enclosure into water droplets or fog on the cooler surface of the mirror.

A fogless shower mirror system according to the present invention includes a mirror assembly and an attachment system for attaching the mirror assembly to the wall of a shower enclosure. The mirror assembly includes a rectangular tablet-shaped mirror housing that has generally parallel front and rear sides, and includes a thin, vertically elongated rectangular-outline front mirror housing shell that holds therein a rectangular reflective mirror plate.

The mirror housing includes a thicker rectangular-outline rear shell that has a front side which is congruent with the rear side of the front frame shell. The rear mirror housing shell contains a water reservoir that is located concentrically within outer perimeter flange walls that extend forward from a rear wall of the shell. The water reservoir includes a vertically elongated rectangular frame that has outer perimeter walls which are parallel to and recessed inwardly from the outer perimeter flange walls of the rear mirror housing shell.

The outer perimeter walls of the water reservoir frame extend forward into a hollow interior space of the rear mirror housing shell, and include a top reservoir perimeter wall that is located a short distance below the top outer perimeter flange wall of the rear mirror housing shell. The water reservoir also has left and right-side water reservoir perimeter walls which are located equal short distances inwardly from the left and right outer perimeter flange walls of the rear mirror housing shell, and a bottom water reservoir perimeter wall that is located a greater distance upwards from the bottom outer perimeter wall of the rear mirror housing shell.

The water reservoir has openings through its rear, outer side that are fillable with warm water, and openings in the front, inner side of the frame that enable the warm water to contact the rear surface of the reflective mirror plate. When heat transferred to the mirror plate from the water warms the front reflective surface of the mirror plate to a temperature greater than that of water vapor within a shower enclosure, the heated surface prevents the condensation of water vapor into droplets of water or "fog" on the surface of the mirror. Such condensation would otherwise cause the imaging capability of the mirror to be degraded to an extent that would render the mirror essentially unusable for performing personal care functions, such as shaving.

The water reservoir of a fogless shower mirror system according to the present invention has a novel design and construction that results in substantial performance advancements over prior art fogless mirrors. Specifically, the design and construction of the fogless shower mirror system according to the present invention increases the efficiency of heat transfer from water in the reservoir to the reflective mirror plate. The novel design and construction of the reservoir according to the present invention also increases the time duration that condensation of water vapor on the surface of the mirror is prevented before the reservoir needs to be re-filled with warm water, thus increasing the duration that the mirror can be effectively used to perform personal care functions such as shaving.

The novel design of the water reservoir of the fogless shower mirror according to the present invention includes a vertically arranged series of laterally elongated, adjacent reservoir compartments. Each compartment has in a rear elevation view a laterally elongated rectangular outline shape and includes a rectangular inner, front side opening that contacts the rear surface of the front reflective mirror plate, and a rectangular outer, rear side opening for enabling the compartment to be filled with warm water.

The vertically arranged series of individual compartments of the water reservoir are located in a vertically elongated, rectangularly shaped opening of the rear mirror housing shell. The upper perimeter wall of the top compartment of the water reservoir is formed by the upper perimeter wall of the rectangular opening in the rear shell. The upper perimeter wall is located a short distance below the upper horizontally disposed outer perimeter wall of the rear mirror housing shell.

The upper wall of the top reservoir compartment is coextensive with the top reservoir perimeter wall, which has the form of a laterally elongated rectangular plane that extends laterally between laterally opposed, parallel, left and right vertical reservoir perimeter side walls of the opening in the rear shell of the mirror housing. The plane of the upper wall of the top reservoir compartment is inclined upwardly from an inner front lateral edge that is adjacent to the rear surface of the reflective mirror plate, to a higher elevation at the outer rear opening in the rear housing shell. In one embodiment, an upper side wall has an inclined at a dihedral angle from 35 degrees to 55 degrees upwardly from a horizontal plane perpendicular to the reflective mirror plate. In an example embodiment of the mirror, the upper side wall is inclined at a dihedral angle of about 40 degrees upwardly from a horizontal plane perpendicular to the reflective mirror plate. In another example embodiment of the mirror, the upper side wall is inclined at a dihedral angle of about 52 degrees upwardly from a horizontal plane perpendicular to the reflective mirror plate. In aspects of this embodiment, an upper side wall is inclined at a dihedral angle in the range of 37 degrees to 43 degrees upwardly from a horizontal plane perpendicular to the reflective mirror plate. In one aspect of this embodiment, an upper side wall is inclined at a dihedral angle in about 40 degrees upwardly from a horizontal plane perpendicular to the reflective mirror plate. In aspects of this embodiment, an upper side wall is inclined at a dihedral angle in the range of 50 degrees to 55 degrees upwardly from a horizontal plane perpendicular to the reflective mirror plate. In one aspect of this embodiment, an upper side wall is inclined at a dihedral angle in about 52 degrees upwardly from a horizontal plane perpendicular to the reflective mirror plate.

The lower wall of the top reservoir compartment is formed by a thin, laterally elongated rectangular baffle plate that is parallel to and shaped similarly to the upper wall plane of the opening in the rear side of the mirror housing, and is inclined upwardly at the same dihedral angle from a horizontal plane perpendicular to the reflective mirror plate.

Constructed as described above, the top reservoir compartment has the shape of a laterally elongated, downwardly and inwardly disposed rectangular cross-section channel that has in a side sectional view the outline shape of a regular parallelogram. The top reservoir compartment channel has parallel upper and lower walls that are inclined upwardly and rearwardly from the rear surface of the reflective mirror plate, to form a laterally elongated, rectangularly shaped opening for receiving warm water.

Each of the other compartments of the fogless shower mirror water reservoir according to the present invention are shaped identically to the top compartment. Thus a second water reservoir compartment located immediately below the top compartment includes an upper wall that is coextensive with the lower baffle plate of the first, top compartment. The second compartment has a lower wall consisting of a lower baffle plate that is identical to the upper baffle plate of the second compartment, and the lower baffle plate is coextensive with the upper wall of a third reservoir compartment that is located immediately below the second compartment.

Each successive compartment of the water reservoir is constructed in exactly the same way as the second compartment, with the single exception that the lower wall of the bottom compartment consists of a horizontal bottom plane of the rectangular rear reservoir entrance opening in the rear housing shell. A fogless shower mirror according to the present invention can have a single reservoir compartment, but more preferably a plurality of reservoir compartments. For, example, a fogless shower mirror according to the present invention can have from 1 to 20 reservoir compartments, 5 to 19 reservoir compartments, 6 to 18 reservoir compartments, 7 to 17 reservoir compartments, 8 to 16 reservoir compartments, 9 to 15 reservoir compartments, 10 to 14 reservoir compartments, or 11 to 13 reservoir compartments, but the exact number and sizes of the compartment are not believed to be critical. In one an embodiment of a fogless shower mirror according to the present invention has 8 reservoir compartments. In another embodiment of a fogless shower mirror according to the present invention has 10 reservoir compartments. In a preferred embodiment of a fogless shower mirror according to the present invention has 10 to 14 reservoir compartments. In a preferred embodiment of a fogless shower mirror according to the present invention has 11 to 13 reservoir compartments. In a most preferred embodiment of a fogless shower mirror according to the present invention has 12 reservoir compartments.

According to the present invention, the downwardly angled forward edges of each of the reservoir compartment baffle plates are spaced adjacent to and a short distance rearward of the rear surface of the reflective mirror to form a slit-shaped opening. Such slit-shaped openings enable water from an upper reservoir compartment to flow downwardly on the rear surface of reflective mirror plate towards a lower reservoir compartment. In one embodiment, the distance of the space formed by slit-shaped openings is in the range of 0.01 mm and 0.1 mm. In one embodiment, the distance of the space formed by slit-shaped openings is in the range of 0.02 mm and 0.07 mm. In one embodiment, the distance of the space formed by slit-shaped openings is in the range of 0.03 mm and 0.06 mm. In an aspect of this embodiment, the distance of the space formed by slit-shaped openings is about 0.05 mm. Such spacing results in a reflective mirror plate being warmed sufficiently in about 5 seconds and remain fogless for about 5 minutes.

In another embodiment, the distance of the spacing can range from between 0.05 mm at a water temperature of 40° F. to about 0.02 mm at a water temperature of 140° F. In another embodiment, the distance of the spacing can range from between 0.01 mm at a water temperature of 70° F. to about 0.05 mm at a water temperature of 120° F.

According to the present invention, the spacing between the front edge of each baffle plate of a reservoir compartment and the rear surface of the reflective mirror plate creates a thin, laterally elongated, generally rectangularly-shaped leakage channel that causes water in each compartment to flow downwardly under the force of gravity to lower elevations. This flow causes the lower reservoir compartments to be overfilled, resulting in water flowing outwardly from the open rear sides of the compartments and cascading downwards to the outer rear sides of lower reservoir compartments.

The flowing water is effective in transferring heat to the mirror more quickly than standing water, decreasing the time required for the mirror to defog and increasing the time duration that the mirror may be used before becoming fogged.

The mirror assembly according to the present invention includes a pair of small cross-section drainage channels that are connected to the bottom water reservoir compartment, to drain water from the bottom compartment. Each drainage channel has an upper entrance opening that is disposed vertically through the bottom side wall of the bottom water reservoir compartment, and a lower discharge opening that is disposed vertically through bottom outer perimeter flange wall of the rear mirror housing shell.

The drainage channels have a cumulative cross-sectional area of about 1.0 mm$^2$, and provide a discharge rate of about 1.6 L/min. Also, each of the water reservoir compartments has a volume of about 69.3 mL. In tests of a fogless water mirror with the foregoing dimensions, it was found that about 2.5 seconds were required for completely filled upper water reservoir compartments to be emptied, and about 25 seconds for the bottom reservoir compartment to be emptied through the two discharge channels.

The novel construction of a fogless shower mirror water reservoir described above, comprised of a vertically arranged series of adjacent contacting water compartments, has proven to be highly effective in transferring heat from warm water that has been introduced into the compartments to the reflective mirror plate for long periods of fog-free usage of the mirror. Thus even though the upper reservoir compartments become emptied in about 25 seconds, the reflective mirror plate is warmed sufficiently to remain fogless for about 5 minutes.

The fogless shower mirror according to the present invention has additional novel features that combine with construction features described above to create a versatile illuminated fogless shower system that has additional advantageous features. Specifically, the performance advantage in the length of time that the mirror remains fogless is augmented by the ease with which the water reservoir may be filled with warm water and emptied of cooled water.

The fogless shower mirror system according to the present invention includes, in addition to the novel mirror assembly, an attachment system that facilitates attaching the mirror assembly to the wall of a shower enclosure at any selected from a relatively wide range of heights on the wall, removing the mirror to empty and re-fill the mirror reservoir with warm water, and replacing the mirror at a desired location.

The novel construction of a water reservoir of the mirror assembly described above incorporates additional features that facilitate the temporary attachment of the mirror to a wall or a shower enclosure at a wide range of selected heights, quickly and easily removing the mirror from the wall to empty the mirror reservoir, refill it with warm water, and quickly and easily re-attaching the mirror to the shower wall at a selected height. The foregoing versatile attachment, removal, and re-attachment features of a fogless shower mirror system according to the present invention are implemented by novel additional structural features of the mirror assembly will now be described.

The novel attachment system of the fogless shower mirror system according to the present invention includes a pair of thin, laterally spaced apart, vertically disposed hanger rib plates. Each hanger rib plate is located adjacent to the rear surfaces of the mirror plate, and has a vertically arranged series of vertically spaced apart individual attachment hook members that extend rearward into channels of individual compartments of the rear water reservoir. Each of the two hanger rib plates is positioned a short distance laterally inwards from an adjacent inner vertical perimeter wall of the rectangularly shaped rear reservoir opening. Also, each of the two hanger rib plates has a front part that has the shape of a thin, vertically elongated plate that has a straight vertical front edge and straight, parallel left and right sides. Although the attachment system of the fogless shower mirror system is described with two hanger rib plates, the attachment system could be designed to include three or four hanger rib plates.

Each hanger rib plate has extending rearward into the flat vertical front wall surface thereof a vertically arranged series of shallow, vertically elongated rectangular sideview notches that are located adjacent to the rear side of the front reflective mirror plate. Unnotched parts of the front wall of each rib form between each pair of notches a rectangular lug.

A notch and a small rectangular lug protrude forward from the front surface of each hanger rib plate between each pair of upper and lower reservoir compartment baffle plates. A notch in the front vertical edge wall of each rib, and the adjacent lug, are located between the upper and lower baffle plates of each water reservoir compartment. The front surfaces of the lugs contact the rear surface of the reflective mirror plate, and the notches in the ribs enable water in each reservoir compartment to flow freely between three laterally adjacent sub-compartments that are created in each compartment by the two vertical ribs.

The front plate part of each hanger rib plate has extending rearward from a vertical rear surface thereof a vertically arranged series of attachment hook members. Each attachment hook member has in a side elevation view the shape of an upwardly and rearwardly inclined boss that has a uniform thickness and an outline shape of a parallelogram. The rear vertical side of each attachment hook member boss has extended upwardly and outwardly thereof an arcuately curved hook that has on a lower side thereof an arcuately upwardly curved notch.

Constructed as described above, each hanger rib plate has the form of a thin, uniform thickness plate that in a side elevation view includes a vertically elongated web. The web has a flat, vertically disposed surface that has extending rearwardly therefrom a series of rectangular notches that are separated by a series of lugs which have flat front surfaces which lie in a common front vertical plane that confronts the rear vertical surface of the mirror plate.

Each lug and an adjacent notch located below it have extending from the rear vertical side thereof a parallelogram shaped hook member that is inclined upwardly and rearwardly from the web. Each hook member has approximately the same cross-sectional shape and size as those of the water reservoir compartment, and extends rearwardly into a compartment.

Thus constructed, the fogless shower mirror according to the present invention has protruding outwardly from the channel between the rear edges of each pair of upper and lower baffle plates of each water reservoir compartment a pair of laterally spaced apart suspension hooks. Each suspension hook has the shape of a thin, uniform-thickness block that has an arcuately curved convex upper surface and an arcuately upwardly curved concave lower hook opening.

The fogless shower mirror system according to the present invention includes in combination with the suspension hooks that protrude rearwardly from the rear reservoir compartment of the mirror housing a wall-mount suspension bracket for attachment to a vertical wall surface, such as that of a shower enclosure wall.

According to the invention, an attachment system includes a thin, laterally elongated rectangular bracket plate. The bracket plate has extending forward from a straight, laterally disposed upper edge thereof a thin, elongated flange. The flange preferably spans a substantial fraction of the entire width of the upper edge wall, and may be fabricated with the remaining parts of the suspension holder as a one-piece part that may be fabricated as an injection molded plastic part.

The suspension bracket flange extends forward a short distance from the flat front surface of the suspension bracket plate and has formed on a front transverse edge thereof a laterally disposed straight retainer rib that has a convex, arcuately curved semicircular cross-sectional shape. The cross-sectional shape of the suspension bracket plate retainer rib is complementary to that of the upwardly opening notches in the lower sides of each laterally spaced apart pair of suspension hooks that protrude outwardly from the rear opening of each water reservoir compartment.

According to the invention, the rear surface of the fogless mirror system suspension bracket plate may optionally have attached thereto a pressure-sensitive adhesive strip. The adhesive strip includes a pressure-sensitive adhesive layer that has affixed lightly to the outer surface thereof a protective release sheet that may be peeled off to expose the underlying adhesive layer when it is desired to fasten the suspension plate to a shower wall.

Optionally, the suspension bracket may include a relatively weakly adhering, temporary adhesive fastener layer that overlies an inner, more strongly adhering semi-permanent fastener layer. With this option, the suspension holder may be temporarily fastened to a shower wall at various tentative locations using the weakly adhering fastener until a user decides on a preferred semi-permanent location. The weakly adhering temporary adhesive fastener may then be peeled off, and the underlying semi-permanent fastener pressed against the wall to fasten the suspension plate in the desired semi-permanent location.

After the suspension bracket of the fogless shower mirror system has been attached to a shower wall as described above, the mirror assembly of the system may be grasped by a user, and oriented horizontally with the mirror facing downward, and positioned below streams of warm water issuing from a shower head nozzle, to thereby fill the water reservoir compartments in the rear side of the mirror housing through their upwardly facing rear openings.

When the water reservoir compartments have been filled with warm water, the mirror assembly is oriented vertically, with the suspension hooks protruding from the rear side of the mirror assembly positioned in front of the wall-mounted suspension bracket. The upper end of the mirror assembly is then tilted slightly towards the wall and the mirror moved vertically to a desired viewing height. The mirror is then moved rearward and downwardly to engage a pair of selected suspension hooks nearest the suspension bracket rib with the pair of selected suspension hooks to thus hang the mirror at the desired height.

Since the fogless shower mirror according to the present invention includes a vertically arranged series of suspension hook pairs that span a significant fraction of the mirror housing height. For example, in a preferred embodiment where a fogless shower mirror has 12 reservoir compartments, 11 suspension hooks over a distance of about 8 inches are present, giving a user of the mirror the ability to position the mirror at various heights selected from a wide range of heights.

A fogless shower mirror system according to the present invention may optionally include a squeegee for removing water from the front surface of a mirror, that may have condensed after the mirror has been used and not refilled with warm water. Thus according to the present invention, a squeegee having a thin, elongated rectangular handle strip and an elongated resilient squeegee strip extending from the long edge of the handle strip may be provided as part of the fogless shower mirror system.

With the squeegee option, the suspension bracket preferably includes one or more fasteners for holding a squeegee when it is not in use. In an example embodiment of a fogless mirror system according to the present invention, the suspension bracket plate had located at each opposite short vertical side edges thereof a laterally outwardly extending spring clip for compressively retaining the vertically oriented handle strip of a squeegee.

A preferred embodiment of a fogless shower mirror system according to the present invention includes in the mirror assembly an internal illumination source for illuminating objects, such as a person's face, located in front of the mirror, and an internal rechargeable electrical power source for supplying electrical power to the illuminator. This embodiment has an illuminator that includes a series of regularly spaced light emitting Light Emitting Diodes (LED's). The LED's are attached at regularly spaced-apart intervals to the periphery of a flat rectangular ring that has a perimeter slightly larger than that of the reflective mirror plate. According to the present invention, the LED ring is located concentrically with respect to the reflective mirror plate, and the plane of the ring is vertically aligned with the plane of the mirror plate.

The illuminated fogless shower mirror according to the present invention has a light-transmissive window to transmit light rays that have been emitted by the LED's and diffusely reflected off of interior surfaces of the mirror housing out through the front side of the mirror housing and into a region located in front of the reflective mirror plate. In this embodiment, the light-transmissive window consisted of a flat, rectangular bezel ring made of a diffusely light-transmissive polymer, which was positioned as a bezel ring around the perimeter of the mirror plate.

According to the invention, a rechargeable power source for powering the LED light ring included a laterally-elongated, generally semi-cylindrically shaped enlargement of the rear mirror housing. The housing enlargement was located parallel to and adjacent to the lower rear horizontal side of the rear mirror housing, and contained a rechargeable battery, for example a 3.7-volt rechargeable battery.

A fogless shower mirror system according to the present invention also included in the rear housing an electronic circuit board which contained battery charge control circuitry and ballast circuitry for interconnecting between the LED's and the battery.

A fogless shower mirror also includes an electrical power input jack located in the bottom panel of the rear mirror housing, which is electrically connected to the charge control circuitry. Recharging of the internal battery is accomplished by removing the mirror from the suspension holder to a location outside of the shower enclosure, where a 110-volt to d.c. adapter plugged into a power receptacle may be connected through a cable and d.c. output plug to the re-charge input jack.

BRIEF DESCRIPTION OF THE DRAWINGS

FIG. 2 is a rear perspective view of the fogless shower mirror system of FIG. 1 showing a mirror assembly thereof removed from an attachment system thereof.

FIG. 3 is a front elevation view of the mirror assembly of FIG. 1.

FIG. 4 is a rear elevation view of the mirror assembly of FIG. 2.

FIG. 5 is a top plan view of the fogless shower mirror system of FIG. 1.

FIG. 6 is a bottom plan view of the fogless shower mirror system of FIG. 1.

FIG. 9 is a front elevation view of an attachment system of FIG. 2 showing wall-mount suspension bracket and squeegee of the fogless shower mirror system of FIG. 2.

FIG. 10 is a rear elevation view of the wall-mount suspension bracket and squeegee of FIG. 9.

FIG. 11 is an exploded view of the wall-mount suspension bracket and squeegee of FIG. 9, showing the squeegee removed from the bracket thereof.

FIG. 12 is a top plan view of the wall-mount suspension bracket of FIG. 9.

FIG. 13 is a bottom plan view of the wall-mount suspension bracket of FIG. 9.

FIG. 14 is a left-side elevation view of the wall-mount suspension bracket of FIG. 9, the right-side elevation view being a mirror image of the left side view.

FIG. 15 is a front elevation view of the squeegee of FIG. 9.

FIG. 16 is a rear elevation view of the squeegee of FIG. 9.

FIG. 17 is a left-side elevation view of the squeegee of FIG. 9, the right-side elevation view being a mirror image of the left-side view.

FIG. 18 is a fragmentary exploded bottom view of the fogless shower mirror system of FIG. 1.

FIG. 20 is a front elevation view of a hanger rib plate of the fogless shower mirror system shown in FIG. 19.

FIG. 21 is a rear elevation view of the hanger rib plate of FIG. 20.

FIG. 22 is a side elevation view of the hanger rib plate of FIG. 20.

FIG. 23 is a top plan view of the hanger rib plate of FIG. 20.

FIG. 24 is a bottom plan view of the hanger rib plate of FIG. 20.

FIG. 25 is a broken-away view of the mirror assembly of FIG. 19, showing in front elevation a rear housing part of the mirror.

FIG. 26 is a broken-away view of the mirror assembly of FIG. 19, showing in rear elevation a front housing part of the mirror.

FIG. 33 is a cross-sectional view of pressure-sensitive adhesive strip.

DESCRIPTION

Figure 1:
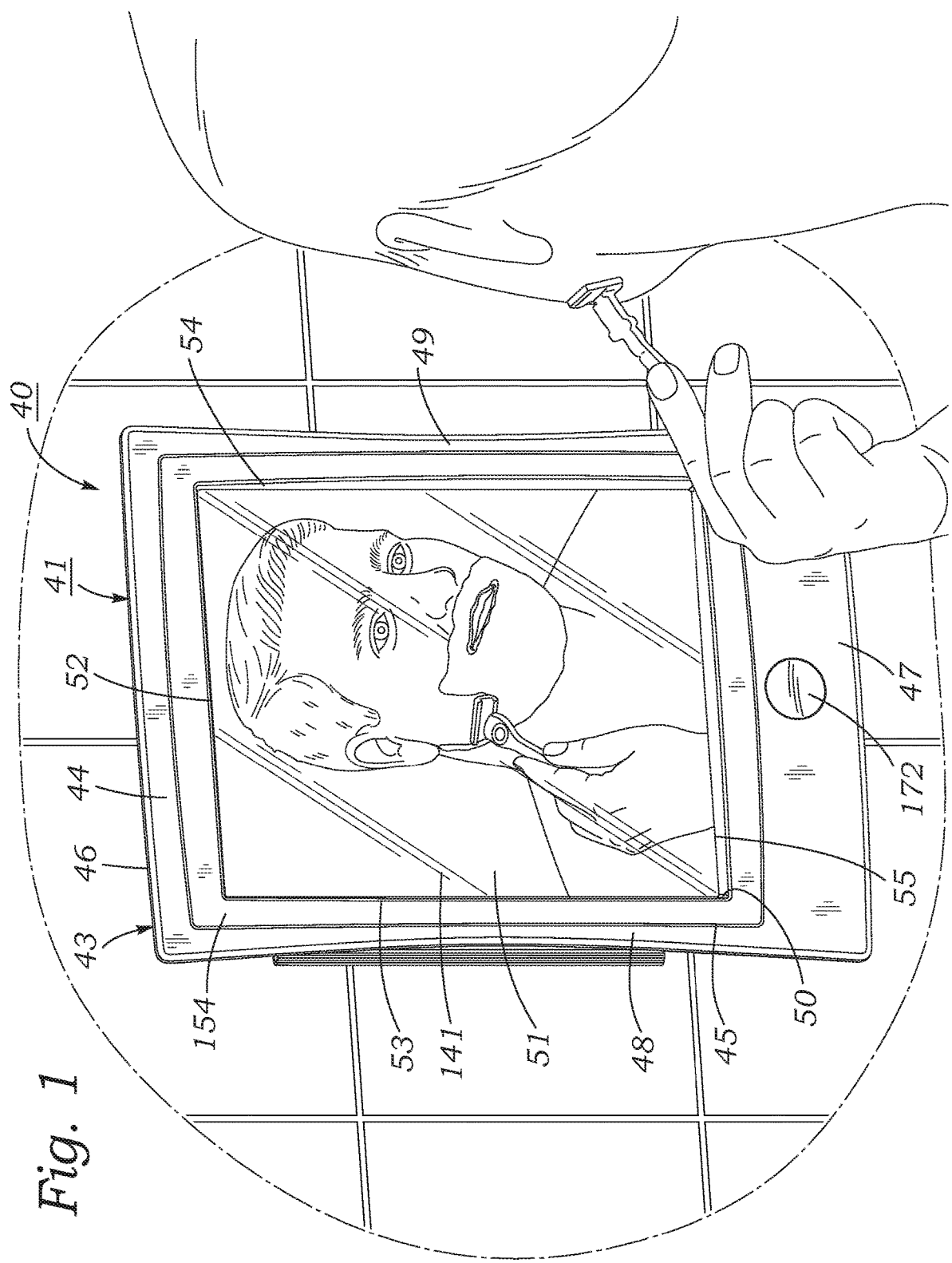
FIG. 1 is a front perspective view of a fogless shower mirror system according to the present invention, shown mounted to a wall.
Figure 7:
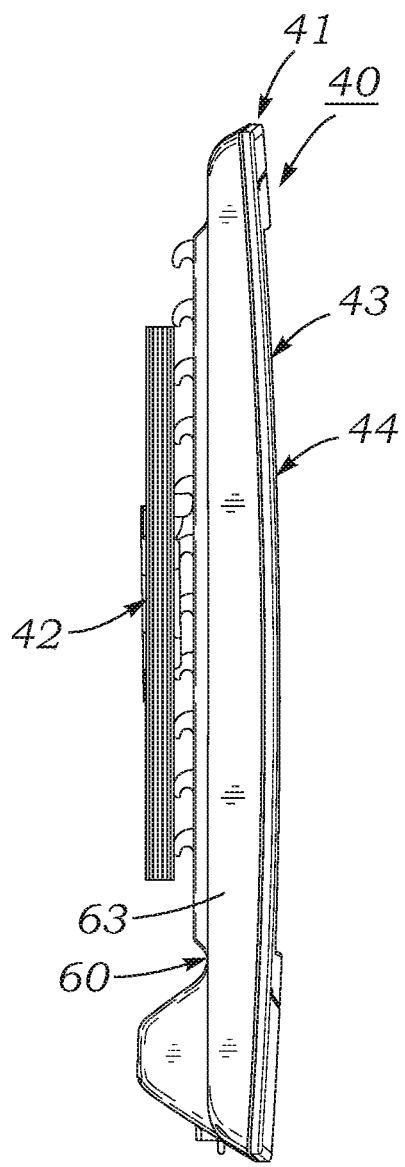
FIG. 7 is a left-side elevation view of the fogless shower mirror system of FIG. 1.
Figure 8:
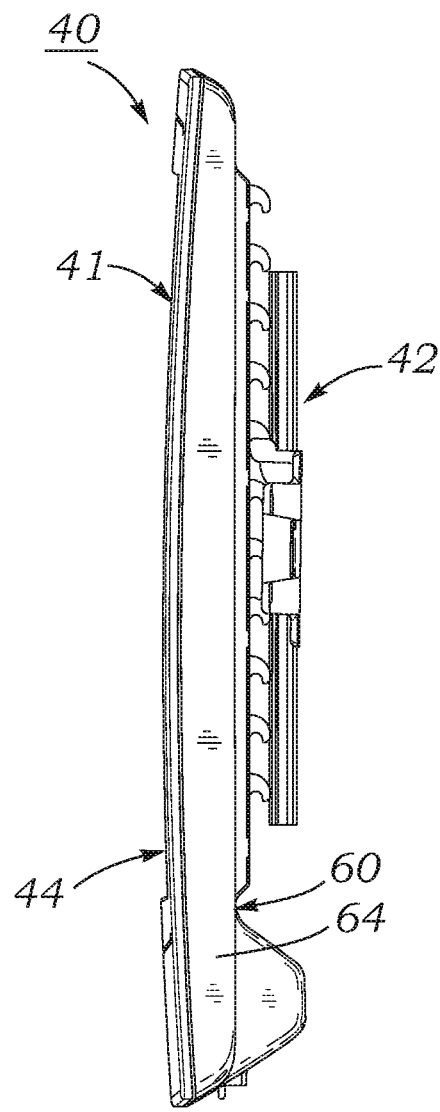
FIG. 8 is a right-side elevation view of the fogless shower mirror system of FIG. 1.

FIGS. 1-32 illustrate the construction and functions of a fogless shower mirror system according to the present invention.

As may be understood by referring to FIGS. 1-4, an fogless shower mirror system 40 according to the present invention includes a mirror assembly 41 and an attachment system 42 for removably attaching mirror assembly 41 at adjustable heights to a vertical surface such as that of a shower enclosure wall, removing the mirror assembly to fill it with warm water, and re-attaching the mirror assembly to the wall-mount bracket at a height selected to be suitable for facilitating performance of a personal care function such as shaving.

As shown in FIGS. 1-4, mirror assembly 41 of a fogless shower mirror system according to the present invention includes a rectangular tablet-shaped mirror housing 43. Mirror housing 43 has in a front elevation view a vertically elongated, rectangular outline shape.

As may be understood by referring to FIGS. 3, 5 and 6, mirror housing 43 has a front part consisting of a relatively thin, rectangular elevation view front mirror housing shell 44. Referring to FIGS. 5 and 6, front mirror housing shell 44 has a vertically elongated, rectangular outline shape that includes a front panel 45. Front mirror housing shell 44 also has thin flange walls that are curved rearwardly from front panel 45 and extend perpendicularly rearward from front panel 45. Rearwardly extending flange walls of front mirror housing shell 44 consist of a top flange wall 46, a bottom flange wall 47, a left flange wall 48, and a right flange wall 49.

As shown in FIGS. 1 and 3, front panel 45 of front mirror housing shell 44 has set in a rectangular opening 50 a rectangularly shaped reflective mirror plate 51 that is concentrically located in front panel 45. Mirror plate opening 50 has top, left, and right edges 52, 53, 54, that are parallel to top, left, and right flange walls 46, 48, 49, of front mirror housing shell 44, and are positioned equal short distances inwardly from the flange walls. Mirror opening 50 also has a bottom edge 55 that is parallel to and located a greater distance from the bottom flange wall 47 of the front mirror housing shell 44 than the distance between the side edges and side flange walls. As shown in FIG. 26, the rearward extending flange walls 46, 47, 48, and 49 of front mirror housing shell 44 have co-planar rear edges 56, 57, 58, and 59, respectively.

As may be seen by referring to FIGS. 4-8 and 18, mirror housing 43 of mirror assembly 41 includes a rear part comprising a rear mirror housing shell 60. Rear mirror housing shell 60 has a shape similar to that of front mirror assembly housing shell 44, but is thicker. Rear mirror housing shell 60 has a rear panel 61 and top, left, right and bottom flange walls 62, 63, 64 and 65 that extend perpendicularly forward from the rear panel. Thus, the forward extending flange walls of rear mirror housing shell 60 comprise a top flange wall 62, a bottom flange wall 63, a left flange wall 64, and a right flange wall 65. The frontwardly extending rear flange walls of the rear housing shell have front edges 66, 67, 68, 69, respectively, that congruently contact rear edges 56, 57, 58, and 59 of flange walls 46, 47, 48, and 49, respectively of front mirror housing shell 44.

As may be understood best by referring to FIGS. 25 and 26, the four rearwardly extending peripheral flange walls of front mirror housing shell 44 form a rearwardly extending rectangular ring 70 that has flat outer sides and a thin, flat rectangular ring-shaped rear mating surface 71. Similarly, the four forwardly extending peripheral flange walls of rear mirror housing shell 60 form a forwardly extending rectangular ring 72 that has flat outer sides and a thin, flat rectangular ring-shaped front mating surface 73.

Figure 19:
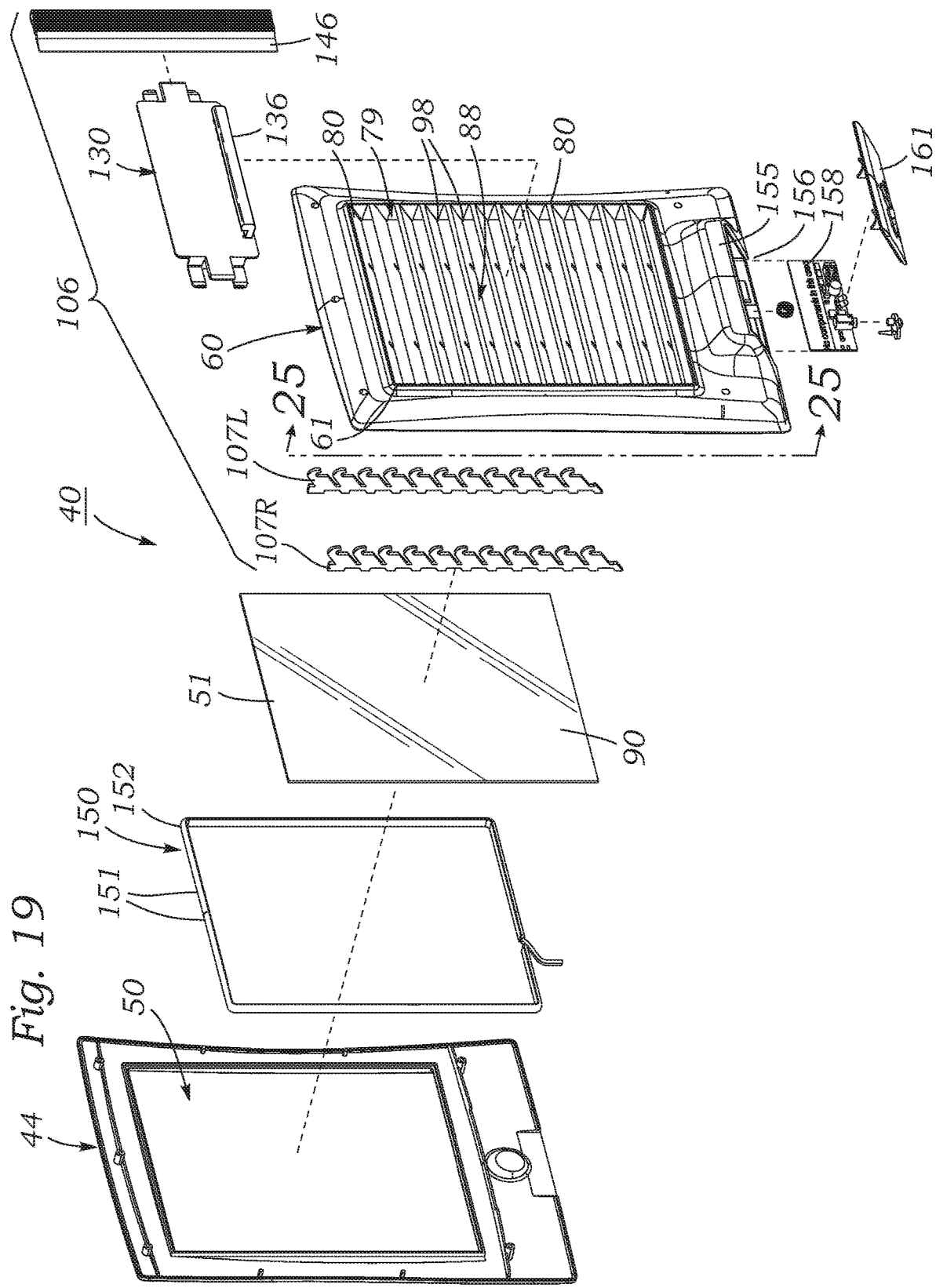
FIG. 19 is an exploded perspective view of the fogless shower mirror system of FIG. 1.

As may be understood by referring to FIG. 19, front mirror housing shell 44 is joined to rear mirror housing shell 60 to form an enclosed mirror housing. As shown in FIGS. 25 and 26, mirror housing shell 44 and rear mirror housing shell 60 are fastened together by a series of studs 75 that extend rearward from rear surface of front panel 45 of front mirror housing shell 44. Studs 75 are arranged in a rectangular ring that has sides parallel to the peripheral flange wall ring 70 of front shell 44, and are press-fitted in interference fits into sockets 77 that extend forward from a front inner wall surface 78 of rear mirror housing shell 60 that are also arranged in a rectangular ring which is congruent with the stud ring.

FIGS. 2, 4, 19-25, and 27 illustrate construction details of a water reservoir 79 which is part of mirror assembly 41. As may be seen best by referring to FIGS. 4, 19, and 25, reservoir 79 has generally the form of a thin, vertically elongated, rectangularly shaped frame 80 that fits conformally into a rectangular opening 81 through rear panel 61 of rear mirror housing shell 60.

As shown in FIG. 4, frame 80 of reservoir 79 has an outer peripheral wall 83 that has the shape of a thin, rectangular ring which has flat outer peripheral surface which contact inner sides of opening 81 in rear panel 61 of rear mirror assembly housing shell 60. As shown in FIGS. 4 and 25, thus constructed, frame 80 of reservoir 79 has top, left, and right reservoir peripheral flange sides 84, 85, 86 of outer peripheral wall 83 that are located parallel to and inwardly of top, left, and right outer peripheral flange walls 62, 64, and 65 of rear mirror assembly housing shell 60. The top, left, and right reservoir peripheral flange sides 84, 85, 86 of outer peripheral wall 83 of frame 80 of reservoir 79 are located short distances transversely inwards from adjacent outer peripheral flange walls of rear mirror housing shell 60. Additionally, frame 80 of reservoir 79 also has a bottom reservoir peripheral flange side 87 of outer peripheral wall 83 that is located above bottom outer peripheral flange wall 63 of rear mirror housing shell 60, at a greater spacing than the spacing between top, left, and right-side separation distances between top, left, and right reservoir peripheral flange sides 84, 85, 86 of outer peripheral wall 83.

Figure 27:
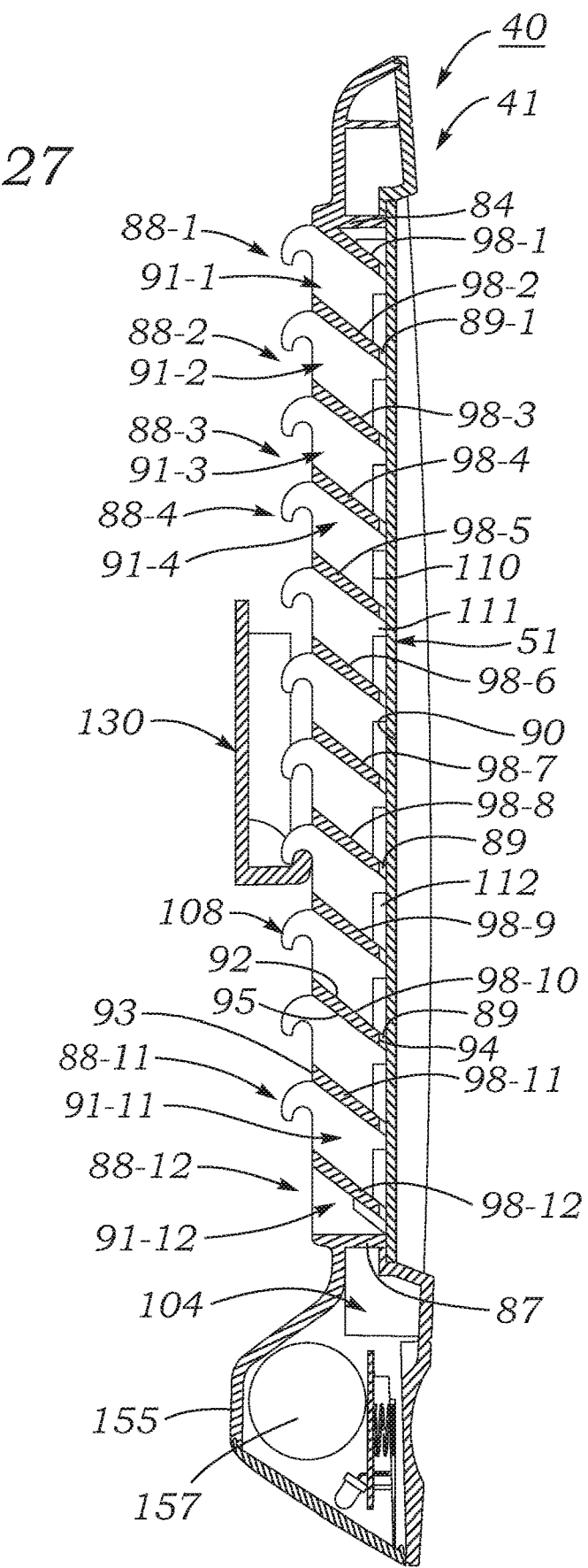
FIG. 27 is a longitudinal medial sectional view of the fogless shower mirror system of FIG. 4, taken in the direction 27-27.

As shown in FIGS. 4, 19, 25, and 27, water reservoir 79 is divided into a vertically arranged series of water compartments 88, e.g., from 1 to 20 reservoir compartments, but the exact number and sizes of the compartment are not believed to be critical. In one an embodiment of a fogless shower mirror according to the present invention had 8 reservoir compartments. In another embodiment of a fogless shower mirror according to the present invention had 10 reservoir compartments. In a preferred embodiment of a fogless shower mirror according to the present invention had 12 reservoir compartments. Each reservoir compartment 88 has the shape of a laterally elongated parallelepiped that has in a rear elevation view a laterally elongated rectangular outline, as shown in FIGS. 4 and 25, and a regular parallelogram shape in a side sectional view, as shown in FIG. 27.

As shown in FIG. 25, in a preferred embodiment, the vertical series of water reservoir compartments 88 include a top compartment 88-1, a vertically arranged series of ten intermediate compartments 88-2 through 88-11, located below the top compartment, and a bottom compartment 88-12 located below the intermediate compartments. As shown in FIG. 27, each reservoir compartment 88 has a thin, laterally elongated, rectangular, slit-shaped, front opening 89 that is adjacent to the rear surface 90 of reflective mirror plate 51 and a rectangular rear opening 91. Rear opening 91 of each reservoir compartment 88 enables the compartment to be filled with warm water. Front opening 89 of each compartment 88 is located at a lower elevation than rear opening 91 so that warm water will gravitate downwards towards the front opening and contact the rear surface 90 of reflective mirror plate 51. As shown in FIG. 25, a vertical series of water reservoir compartments 88 has a common left-side wall coextensive with left-side reservoir peripheral flange wall 85, and a common right-side wall coextensive with right-side reservoir peripheral flange wall 86.

As may be understood by referring to FIG. 27, each water reservoir compartment 88 is formed by flat, laterally elongated rectangular top and bottom baffle plates 98 that extends laterally between laterally opposed parallel left and right reservoir peripheral flange sides 85, 86 of outer peripheral wall 83 of reservoir frame 80, and downwardly and forward into rear mirror housing shell 60. Each baffle plate 98 has a flat upper wall surface 92, a lower flat wall surface 95, a rear edge 93 and a front edge 94. Each baffle plate 98 extends at a downwardly angle from rear edge 93 of rear opening 91 and forward into the interior of rear mirror housing shell 60 to front edge 94.

As can be appreciated from FIG. 27, a baffle plate which serves to define the bottom of one reservoir compartment servers to define the top of a reservoir compartment located below it. Thus, with reference to FIG. 27, baffle plate 98-2 serves to define the bottom of reservoir compartment 88-1 and the top of reservoir compartment 88-2, baffle plate 98-3 serves to define the bottom of reservoir compartment 88-2 and the top of reservoir compartment 88-3, and so forth as shown in FIG. 27. As may be understood best by referring to FIGS. 25 and 27, except for the topmost and bottommost reservoir compartments, each reservoir compartment 88, e.g., reservoir compartment 88-2 through 88-11 in FIG. 25, is constructed in exactly the same way and is similarly shaped. The topmost reservoir compartment, e.g., reservoir compartment 88-1 in FIG. 27, has a top wall that lies in a horizontal plane and is coextensive with top reservoir peripheral flange side 84 of outer peripheral wall 83 of frame 80 of reservoir 79. The bottommost reservoir compartment, e.g., reservoir compartment 88-12 in FIG. 27, has a bottom formed by reservoir peripheral flange side 87 of outer peripheral wall 83 of frame 80 of reservoir 79.

The downwardly angle of one baffle plate 98 parallels the downward angle of each other baffle plates 98. In one embodiment, a downward angle of baffle plates 98 from a horizontal plane perpendicular to the reflective mirror plate is in the range of 35 degrees to 55 degrees. In aspects of this embodiment, a downward angle of baffle plates 88 from a horizontal plane perpendicular to the reflective mirror plate is in the range of 37 degrees to 43 degrees. In one aspect of this embodiment, a downward angle of baffle plates 98 from a horizontal plane perpendicular to the reflective mirror plate is about 40 degrees. In aspects of this embodiment, a downward angle of baffle plates 88 from a horizontal plane perpendicular to the reflective mirror plate is in the range of 50 degrees to 55 degrees. In one aspect of this embodiment, a downward angle of baffle plates 98 from a horizontal plane perpendicular to the reflective mirror plate is about 52 degrees.

Figure 28:
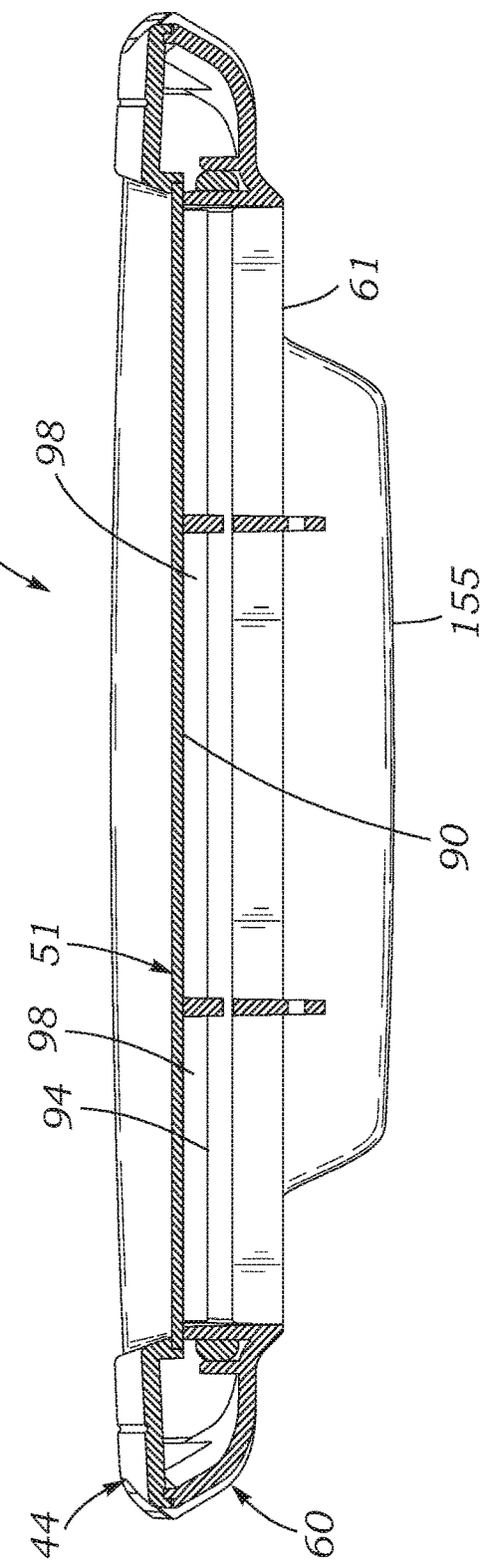
FIG. 28 is an upper transverse sectional view of the fogless shower mirror system of FIG. 4, taken in the direction 28-28.

As shown in FIG. 28, baffle plates 98 lie in a plane that is spaced a short distance rearward of rear surface 90 of reflective mirror plate 51 to create thin, laterally disposed slit-shaped opening 89 between the front edge of each baffle plate and rear surface 90 of the reflective mirror plate 51. Slit-shaped openings 89 enable water from an upper reservoir compartment to flow downwardly on the rear surface 90 of reflective mirror plate 51 towards a lower reservoir compartment. In one embodiment, the distance of the space formed by slit-shaped openings 89 is in the range of 0.01 mm and 0.1 mm. In one embodiment, the distance of the space formed by slit-shaped openings 89 is in the range of 0.02 mm and 0.07 mm. In one embodiment, the distance of the space formed by slit-shaped openings 89 is in the range of 0.03 mm and 0.06 mm. In an aspect of this embodiment, the distance of the space formed by slit-shaped openings 89 is about 0.05 mm.

A lower reservoir compartment 88 that may be overfilled by water flowing downwards from upper compartments may then overflow outwards from rear entrance opening 91 of the lower reservoir compartment, and over the outer rear surfaces of the reservoir compartments, to form a waterfall-like cascade of flowing water.

Figure 29:
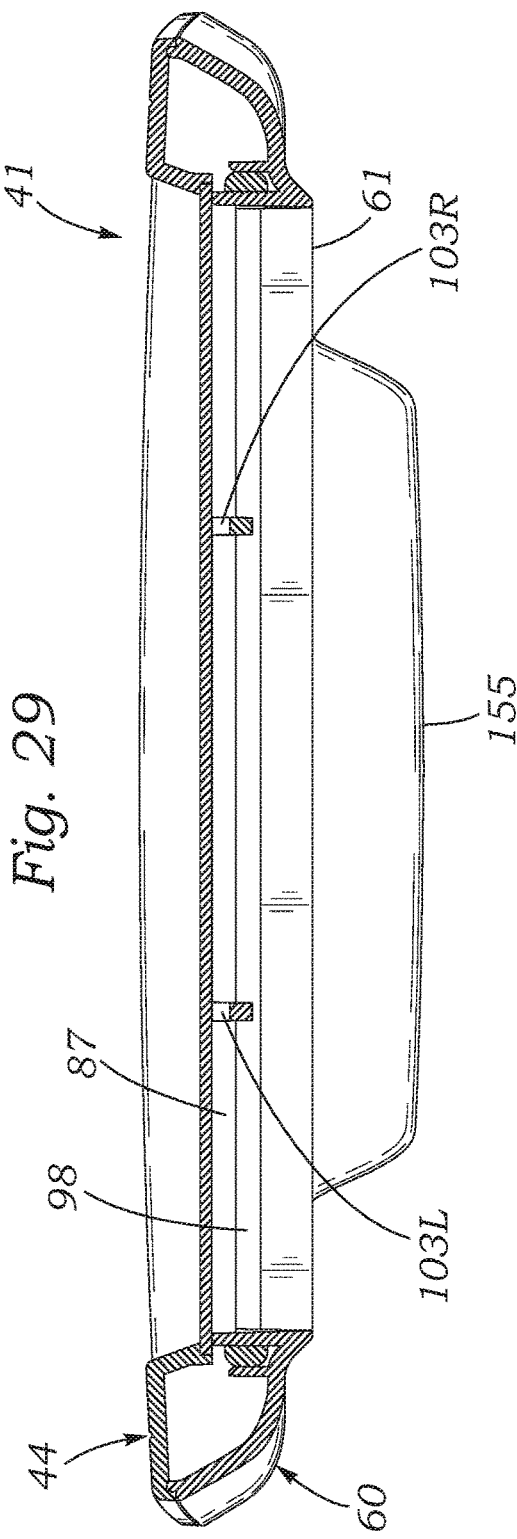
FIG. 29 is an lower transverse sectional view of the fogless shower mirror system of FIG. 4, taken in the direction 29-29.

As may be seen best by referring to FIGS. 4, 25, 27, and 29, mirror assembly 41 includes one or more small cross-section drainage channels 103, e.g., left and right drainage channels 103L, 103R in FIG. 29, located in bottom reservoir flange side 87 that are connected to an interior space 104 of mirror assembly 41. As best shown in FIGS. 27 and 29, each drainage channel 103 has an upper entrance opening that communicates with interior space 104 of mirror assembly 41. Each drainage channel 103 has a lower discharge opening 105, e.g., left and right discharge openings 105L, 105R in FIG. 4, that is disposed vertically through rear wall of rear mirror housing shell 60.

In one embodiment, drainage channels 103 have a cumulative cross-sectional area of about 32 mm². Also, each reservoir compartment 88 has a volume of about 6927 mm³. In tests of a fogless water mirror with the foregoing dimensions, it was found that for a reservoir comprising 12 reservoir compartments it required about 25 seconds to completely empty reservoir compartments 88-1 through 88-11, and about 25 seconds for bottom reservoir compartment 88-12 to be emptied through two discharge channels 103L, 103R.

The novel construction of reservoir 79 described above, comprised of a vertically arranged series of adjacent contacting reservoir compartments 88, has proven to be highly effective in transferring heat from warm water that has been introduced into the compartments to the reflective mirror plate 50 for long periods of fog-free usage of fogless shower mirror system 40. Thus even though the reservoir compartments become emptied in about 25 seconds, the reflective mirror plate 50 is warmed sufficiently to remain fogless for about 5 minutes, a time duration considered to be sufficient for most uses, such as shaving.

The novel construction of reservoir 79 of mirror assembly 41 described above incorporates additional features that facilitate the temporary attachment of the mirror assembly to a wall or a shower enclosure at a wide range of selected heights, quickly and easily removing the mirror assembly from the wall to empty the water reservoir, refilling the reservoir with warm water, and quickly and easily re-attaching the mirror assembly to the shower wall at a selected height.

FIG. 19 illustrate a hanging attachment system 106 of mirror system 40 according to the present invention. Hanging attachment system 106 include one or more thin, laterally spaced apart, vertically disposed hanger rib plates 107, e.g. left hanger rib plate 107L and right hanger rib plate 107R in FIG. 19. As shown in FIG. 27, each hanger rib plate 107 is located adjacent to rear surface 90 of reflector mirror plate 51, and has a vertically arranged series of vertically spaced apart individual attachment hook members 108 that extend rearward into the full length of reservoir 79 abutting the top and bottom. Each of hanger rib plate 107 is positioned a short distance laterally inwards from an adjacent inner vertical perimeter wall of a rectangularly shaped rear opening in frame 80 of reservoir 79.

With reference to FIGS. 20-24, each hanger rib plate 107 has the shape of a thin, vertically elongated plate that has a has a front surface 109, a rear surface 113 and straight, parallel left 114 and right 115 sides. With respect to front surface 109, each hanger rib plate 107 has extending rearward a vertically arranged series of shallow, vertically elongated rectangular notches 110 as defined by flat rectangular lug 111 which protrude forward from front surface 109 of hanger rib plate 107.

With reference to FIGS. 20-24, rear surface 113 of hanger rib plate 107 has extending rearward a vertically arranged series of attachment hook members 108. As shown in FIG. 22, each attachment hook member 108 has the shape of an upwardly and rearwardly inclined boss 116 that has a uniform thickness and an outline shape of a parallelogram. In addition, a rear vertical side 117 extends upwardly and outwardly from each boss 116 to form an arcuately downwardly curved hook 118 which forms a hook notch 120. Each boss 116 also has on a lower side 119.

As constructed, hanger rib plate 107 extends the vertical full length of frame 80 attaching to top and bottom reservoir peripheral flange sides 84, 87, see FIG. 25. Such arrangement subdivides each reservoir compartment 88. For example, with reference to FIGS. 4 and 25, left and right hanger rib plates 107L, 107R, subdivide reservoir compartments 88-1 to 88-12 to create three sub-compartments. In addition, hanger rib plate 107 is located adjacent to rear side 90 of front reflective mirror plate 51, lug 111 abuts rear surface 90 of reflective mirror plate 51 whereas each notch 110 does not touched rear surface 90, thereby creating flow channels 112, see FIG. 27. Flow channels 112 enable water in each reservoir compartment 88 to flow freely between laterally adjacent sub-compartments. For example, with reference to FIGS. 4 and 25, left and right flow channels 112L, 112R enable water in each reservoir compartment 88 to flow freely between the three laterally adjacent sub-compartments created in each compartment by vertical rib plates 107L, 107R.

In addition, as constructed, attachment hook members 108 of hanger rib plate 107 protrude rearwardly from mirror assembly 41. For example, with reference to FIGS. 2, 7 and 27, left and right hanger rib plates 107L, 107R form a vertical series of laterally spaced apart left and right attachment hook members 108L, 108R that protrude rearwardly from reservoir compartments 88 of mirror housing 43 of mirror assembly 41. Such protruding left and right attachment hook members 108L, 108R are used to secure mirror assembly 41 to a vertical wall surface.

The fogless shower mirror system 40 includes in combination with mirror assembly 41, an attachment system 42 for attachment to a vertical wall surface, such as that of a shower enclosure wall.

Referring to FIGS. 9-11, attachment system 42 comprises a wall-mount suspension bracket 130 which includes a thin, laterally elongated rectangular bracket plate 131. Bracket plate 131 has extending forward from its lower edge 132 a straight, laterally disposed, thin, elongated suspension bracket flange 133. Suspension bracket flange 133 preferably spans a substantial fraction of the entire width of lower edge 132, and may be fabricated with the remaining parts of suspension bracket 130 as a one-piece part that may be fabricated as an injection molded plastic part. Suspension bracket flange 133 extends forward a short distance from a flat front surface 134 of suspension bracket plate 131 to form a front transverse edge 135 and a laterally disposed straight retainer rib 136 thereof that has a convex, arcuately curved semi-circular cross-sectional shape. The cross-sectional shape of suspension bracket plate retainer rib 136 is complementary to that of the upwardly opening hook notches 120 of suspension hooks 118 that protrude outwardly from rear opening 91 of each reservoir compartment 88.

Figure 30:
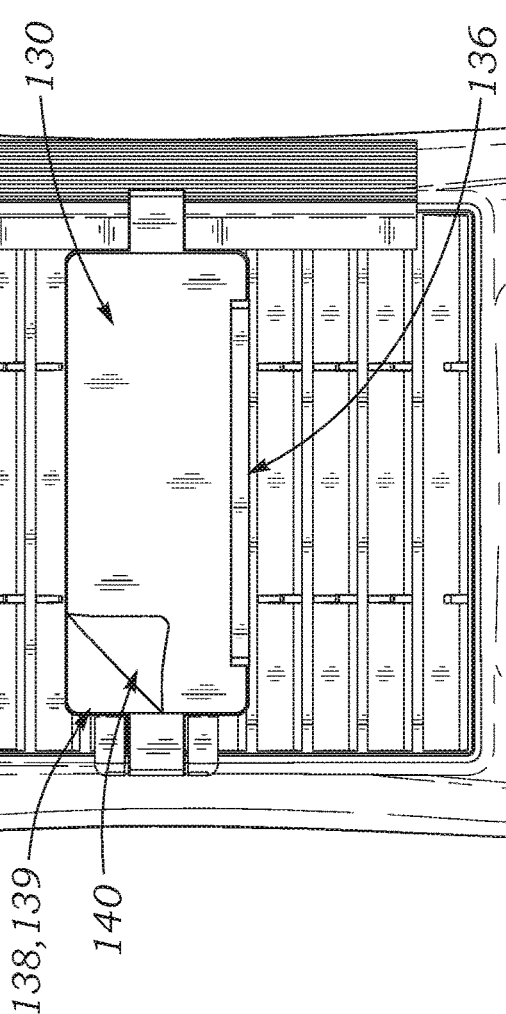
FIG. 30 is a rear elevation view of the fogless shower mirror system of FIG. 1 showing wall-mount suspension bracket thereof attached to a mirror assembly thereof.

Referring to FIG. 30, a rear surface 137 of suspension bracket plate 131 may optionally have attached thereto a pressure-sensitive adhesive strip 138. Adhesive strip 138 includes a pressure-sensitive adhesive layer 139 that has affixed lightly to the outer surface thereof a protective release sheet 140 that may be peeled off to expose the underlying adhesive layer when it is desired to fasten the suspension plate to a shower wall. Optionally, as shown in FIG. 33, pressure-sensitive adhesive strip 138 of suspension bracket flange 133 may include a relatively weakly adhering, adhesive layer 141 that overlies an inner, more strongly adhering semi-permanent adhesive layer 139. With this option, the suspension bracket 133 may be temporarily fastened to a shower wall at various tentative locations using weakly adhering adhesive layer 141 until a user decides on a preferred semi-permanent location. The weakly adhering adhesive layer 141 may then be peeled off, and the underlying semi-permanent pressure-sensitive adhesive layer 139 pressed against the wall to fasten the suspension plate in the desired semi-permanent location.

Referring to FIGS. 9-14, attachment system 42 of fogless shower mirror system 40 may optionally include a squeegee 142 for removing water from a front surface of reflective mirror plate 51, that may have condensed after the mirror has been used and not refilled with warm water. Thus according to the present invention, squeegee 142 having a thin, elongated rectangular handle 144 and an elongated resilient squeegee strip 145 extending from the long edge 146 of the handle 144 may be provided as part of the fogless shower mirror system.

With the squeegee option, suspension bracket plate 131 preferably includes one or more fasteners 148 for holding squeegee 142 on either side of the suspension bracket flange when it is not in use. The one or more fasteners can be located on any side of suspension bracket plate 131, preferably on the left and/or right sides of suspension bracket plate 131. Preferably, the one or more fasteners are spring clips. For example, as illustrated in FIGS. 9-11, suspension bracket plate 131 has located at each of vertical left and right-side edges 147L, 147R laterally outwardly extending fasteners 148L, 148R for compressively retaining vertically oriented handle strip 144 of squeegee 142.

A preferred embodiment of fogless shower mirror system 40 according to the present invention includes an internal illumination source an internal rechargeable electrical power source for supplying electrical power to the illumination source. The internal illumination source and/or internal rechargeable electrical power source can be located within mirror assembly 41. The illumination source is typically located in front of the mirror and is used for illuminating objects, such as, e.g., a person's face. As may be best understood by reference to FIGS. 18 and 19, illumination source 150 includes a series of regularly spaced light emitting LED's 151. LED's 151 are attached at regularly spaced-apart intervals to the periphery of a thin, flat, flexible insulating strip formed into a rectangular ring 152 that has a perimeter slightly larger than that of reflective mirror plate 51. According to the present invention, LED ring 152 is located concentrically with respect to reflective mirror plate 51, and the plane of the ring is vertically aligned with the plane of the mirror plate.

As shown in FIGS. 1 and 3, mirror assembly 41 according to the present invention has a light-transmissive window 154 to transmit light rays that have been emitted by the LED's 151 and diffusely reflected through a front side of mirror housing 43 and into a region located in front of reflective mirror plate 51. In this embodiment, light-transmissive window 154 includes a flat, rectangular bezel ring made of a diffusely light-transmissive polymer, which was positioned as a bezel ring around the perimeter of the mirror plate 51.

As shown in FIGS. 18 and 19, a rechargeable power source for powering the LED ring 152 includes a laterally-elongated, generally semi-cylindrically shaped enlargement 155 of rear mirror assembly housing shell 60 (see also FIGS. 27-29). Housing enlargement 155 is located parallel to and adjacent to the lower rear horizontal side 156 of rear mirror housing shell 60, and contains a compartment for a rechargeable battery 157, for example a 3.7-volt rechargeable battery.

As may be seen best by referring to FIG. 18, illumination source 150 of fogless shower mirror system 40 also includes in rear housing shell 60 of mirror assembly 41 an electronic circuit board 158 that includes battery charging control ballast circuitry 159 for interconnecting between LED's 151 and battery 157. Fogless shower mirror system 40 also includes an electrical power input jack 160 located in the bottom panel 161 of rear mirror housing shell 60, which is electrically connected to the charge control circuitry. Recharging of internal battery 157 is accomplished by removing mirror assembly 41 from wall-mount suspension bracket 130 to a location outside of the shower enclosure, where a 110-volt to d.c. adapter (not shown) plugged into a power receptacle (not shown) may be connected through a cable (not shown) and d.c. output plug (not shown) to electrical power input jack 160 of mirror assembly 41.

As shown in FIG. 18, illumination source 150 includes a power cable 162 that extends from battery 157 and is terminated by a 2-conductor electrical plug 169. Plug 169 is inserted into an electrical jack 170 on electronic circuit board 158. Electrical power is supplied to LED's 151 through wires (not shown) connected to circuit board 158 through press-on/press-off switch 171 operated by a push button 172 located on the front panel of front mirror housing shell 44.

As shown in FIG. 18, circuit board 158 may include a pair of LED's mounted on a lower side of the board. The LED's include blue-light emitting LED 173 to indicate full battery charge and a red-light emitting LED 174 to indicate battery charge state. Light emitted by LED's 173, 174 is transmitted through a small oval window 175 located in bottom panel 161 of mirror assembly 41.

FIGS. 1, 2 and 30-32 illustrate how mirror system 40 is used. First, mirror assembly 41, with attachment system 41 secured to rear surface thereof as shown in FIG. 30, is temporarily placed against a wall of shower enclosure at a convenient height for use by a person. Next, protective sheet 140 covering adhesive strip 138, 139 is peeled off from the adhesive strip. Mirror assembly 41 and bracket are then pressed rearward against the shower enclosure wall to adhesively fasten wall-mount suspension bracket 130 to the shower enclosure wall.

Figure 31:
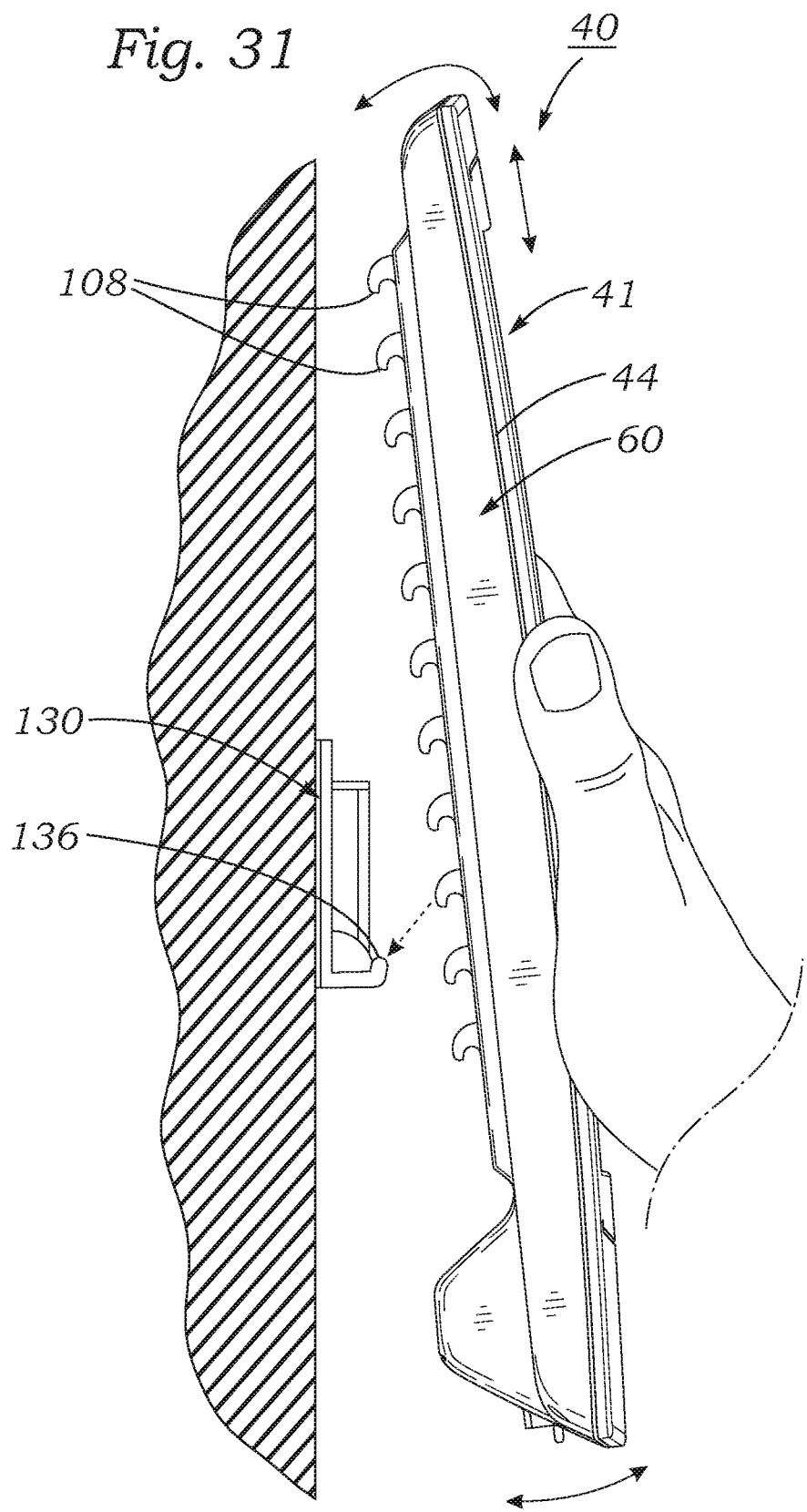
FIG. 31 is a perspective view showing how the mirror assembly of FIGS. 1-4, may be attached to and removed from a wall-mount suspension bracket of the fogless shower mirror system.
Figure 32:
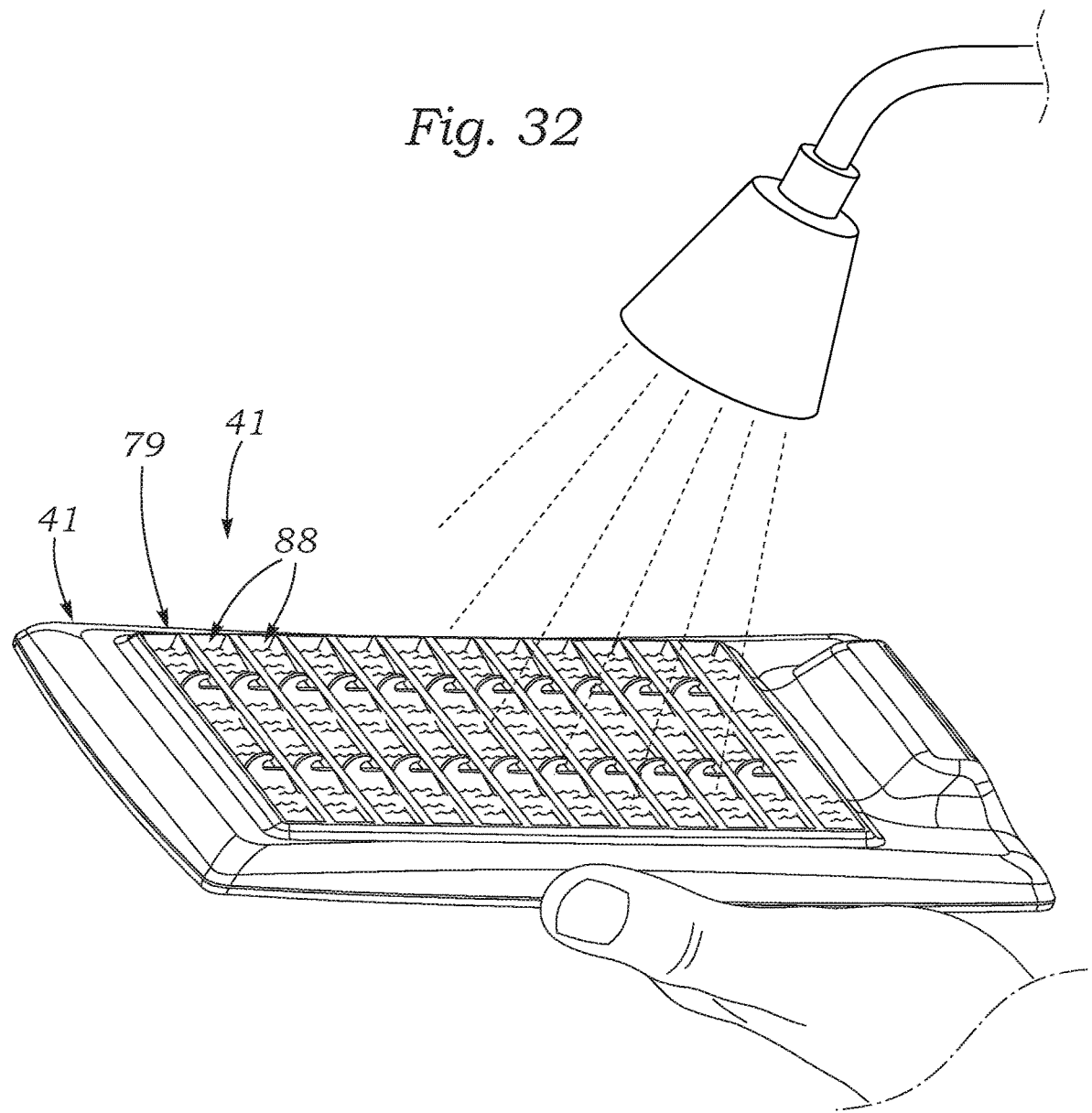
FIG. 32 is a perspective rear view of the mirror assembly of FIGS. 1-4, showing how rear water reservoir components of the mirror assembly may be filled with water.

As shown in FIGS. 2 and 31, mirror assembly 41 is tilted upwards and away from bracket 130 to disengage hook 123 protruding from mirror assembly 41, from rib 136 of bracket 130. As shown in FIG. 32, mirror assembly 41 is then rotated to an inverted horizontal orientation with reflective mirror plate 51 facing downward and a user can fill mirror assembly 41 with water by orienting the mirror assembly horizontally, and positioned mirror assembly 41 below streams of warm water issuing from a shower head nozzle, thereby filling reservoir compartments 88 with water through upwardly facing rear openings 91 of reservoir compartments 88. When water reservoir compartments 88 have been filled with warm water, water-filled mirror assembly 41 is re-hung on mounting bracket 130 as shown in FIG. 31, thus positioning mirror assembly 41 in a desired use position for fog-free shaving or other use. As shown in FIG. 32, rehanging can be achieved by orienting vertically mirror assembly 41 to position hook 118 in front of the wall-mounted suspension bracket flange 133. The upper end of mirror assembly 41 is then tilted slightly towards the wall and mirror assembly 41 moved vertically to a desired viewing height. Mirror assembly 41 is then moved rearward and downwardly to engage selected hooks 118 nearest retainer rib 136 to thus hang the mirror assembly 41 at the height desired by a user.

As shown in FIG. 31, after attachment system 42 of fogless shower mirror system 40 has been attached to a wall surface, mirror assembly 41 of fogless shower mirror system 40 may be secured to attachment system 42 by a user. Since mirror assembly includes a vertically arranged series of suspension hook 118 that span a significant fraction of the mirror housing height, e.g., 12 suspension hooks over a distance of about 8 inches as shown in FIG. 31, a user of the mirror may position the mirror at various heights selected from a wide range of heights.

As an alternative to manually filling reservoir compartments 88 of reservoir 79 with warm water, mirror assembly 41 can be automatically filled with water using a water source. For example, an automatic water-filling adaptor as described in U.S. Pat. No. 10,117,449, which is hereby incorporated by reference in its entirety, can be used to divert a portion of water from a water source, like a shower head, into mirror assembly 41. In this manner, warm water is automatically filling reservoir compartments 88 of reservoir 79 as long as the water source is turned on. Setting up mirror assembly 41 to automatically fill with water dispenses the need of a user to remove and rehang mirror assembly 41 each time fogless mirror system 40 is used as well as providing greater periods of convenient fog-free use of fogless mirror system 40.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as "comprise" and "comprises", and equivalent open-ended transitional phrases thereof like "including," "containing" and "having", encompasses all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A mirror assembly comprising a housing, a reflective mirror plate, and a reservoir for water,
   a. the housing comprising a front side and a rear side opposite the front side and configured to support the reflective mirror plate and the reservoir, the reflective mirror plate located at the front side and the reservoir located at the rear side,
   b. the reflective mirror plate comprising a front side reflective surface and a rear side surface opposite the front side reflective surface, c. the reservoir located on the rear side surface of the reflective mirror plate, the reservoir comprising a plurality of vertically spaced apart reservoir compartments, each reservoir compartment of the plurality of reservoir compartments being defined by an upper baffle plate, a lower baffle plate, a rear opening, and a front opening, wherein the upper and lower baffle plates each have a downward angle from the rear opening towards the front opening so that the front opening is at a lower elevation than the rear opening, wherein the rear opening is an opening on the rear side of the housing and enables each reservoir compartment to be filled with water, and wherein the front opening is a space located between a forward edge of the lower baffle plate and the rear side surface of the reflective mirror plate, the front opening having a distance enabling water in the reservoir compartment to flow downward on the rear side surface of the reflective mirror plate in a manner that enables a transfer of heat from the water to the reflective mirror plate.

2. The mirror assembly of claim 1, wherein the plurality of reservoir compartments includes 8 to 16 reservoir compartments.

3. The mirror assembly of claim 2, wherein the plurality of reservoir compartments includes 10 to 14 reservoir compartments.

4. The mirror assembly of claim 3, wherein the plurality of reservoir compartments comprise 12 reservoir compartments.

5. The mirror assembly of claim 1, wherein the distance of the front opening of each of the plurality of reservoir compartments is 0.01 mm to 0.1 mm.

6. The mirror assembly of claim 5, wherein the distance of the front opening of each of the plurality of reservoir compartments is 0.02 mm to 0.07 mm.

7. The mirror assembly of claim 1, further comprising one or more drainage channels configured to drain water from the reservoir.

8. The mirror assembly of claim 1, wherein the downward angle is in the range of 35 degrees to 55 degrees as measured from the horizontal plane perpendicular to the reflective mirror plate.

9. The mirror assembly of claim 8, wherein the downward angle is in the range of 37 degrees to 43 degrees as measured from the horizontal plane perpendicular to the reflective mirror plate.

10. The mirror assembly of claim 1, wherein the reservoir further comprises a hanging attachment system comprising one or more rib hanger plates, the one or more rib hanger plates including attachments hooks.

11. The mirror assembly of claim 10, wherein the one or more rib hanger plates are vertically arranged in a manner that divides the plurality of reservoir compartments into one or more sub-compartments.

12. The mirror assembly of claim 11, wherein the one or more rib hanger plates further comprise a flow channel spaced rearward of the rear side surface of the reflective mirror plate a distance that enables water in the reservoir to flow between the one or more sub-compartments of each of the plurality of reservoir compartments.

13. The mirror assembly of claim 11, comprising two rib hanger plates, thereby dividing each of the plurality of reservoir compartments into three sub-compartments.

14. The mirror assembly of claim 1, further comprising
   a. an illumination source located internally in the housing,
   b. a light transmissive window on a front side of the mirror assembly and positioned as a bezel ring around the perimeter of the reflective mirror plate, the light transmissive window enabling light from the illumination source to emit out of the housing through the front side surface,
   c. a rechargeable electrical power source located internally in the housing for supplying electrical power to the illumination source.

15. A fogless mirror system comprising a mirror assembly of claim 1 and an attachment system.

16. The fogless mirror system of claim 15, wherein the attachment system comprises a wall-mount suspension bracket, the wall-mount suspension bracket optionally comprising an adhesive strip located on a rear side surface of the wall-mount suspension bracket.

17. The fogless mirror system of claim 16, further comprising a squeegee, wherein the wall-mount suspension bracket further comprises one or more fasteners for holding the squeegee when not in use.

18. A mirror assembly comprising a housing, a reflective mirror plate, and a reservoir for water,
   a. the housing comprising a front side and a rear side opposite the front side and configured to support a reflective mirror plate and a reservoir, the reflective mirror plate located at the front side and the reservoir located at the rear side,
   b. the reflective mirror plate comprising a front side reflective surface and a rear side surface opposite the front side reflective surface, and
   c. the reservoir for water located on a rear side of the reflective mirror plate, the reservoir comprising
      i. 12 reservoir compartments, each of the 12 reservoir compartments having an upper baffle plate, a lower baffle plate, a rear opening for filling with water and a front opening,
         wherein the upper and lower baffle plates each have a downward angle of 35 degrees to 55 degrees from the rear opening towards the front opening as measured from the horizontal plane perpendicular to the reflective mirror plate,
         wherein the rear opening is an opening on the rear side of the housing and enables each reservoir compartment to be filled with water, and
         wherein the front opening is a space located between a forward edge of the lower baffle plate and the rear side surface of the reflective mirror plate is an opening defined by a forward edge of the lower baffle plate, the front opening having a distance of 0.01 mm to 0.1 mm, and
      ii. a hanging attachment system comprising two rib hanger plates, the one or more rib hanger plates including attachments hooks and a flow channel, wherein the two rib hanger plates are vertically arranged in a manner that divides the 12 reservoir compartments into three sub-compartments, and wherein the flow channel spaced rearward of the rear side surface of the reflective mirror plate a distance that enables water in each of the 12 reservoir compartments to flow between the three sub-compartments of each of the 12 reservoir compartments.

19. The mirror assembly of claim 18, further comprising an illumination source located internally in the housing, a light transmissive window on a front side of the mirror assembly and positioned as a bezel ring around the perimeter of the reflective mirror plate, the light transmissive window enabling light from the illumination source to emit out of the housing through the front side surface, and a rechargeable electrical power source located internally in the housing for supplying electrical power to the illumination source.

20. A fogless mirror system comprising
a. a mirror assembly of claim 19,
b. a squeegee, and
c. an attachment system, the attachment system comprises a wall-mount suspension bracket, the wall-mount suspension bracket comprising
   i. an adhesive strip located on a rear side surface of the wall-mount suspension bracket, and
   ii. two fasteners for holding the squeegee when not in use, wherein one of the two fasteners is located on a left side of the wall-mount suspension bracket and the other of the two fasteners is located on a right side of the wall-mount suspension bracket.

* * * * *